Nov. 19, 1957 N. R. FRIEBERG ET AL 2,813,611
FRONT FEED AND OPERATION CONTROL MECHANISM
FOR CALCULATING MACHINES
Filed Feb. 24, 1954 19 Sheets-Sheet 7
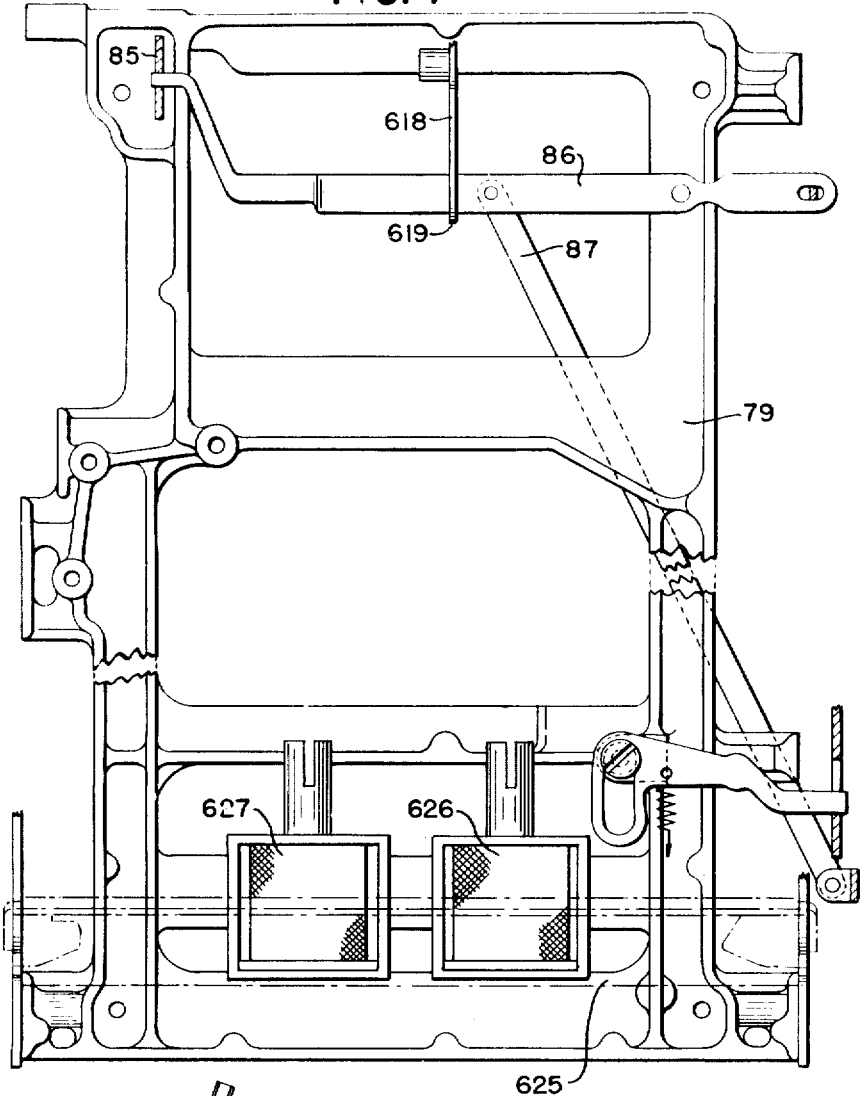
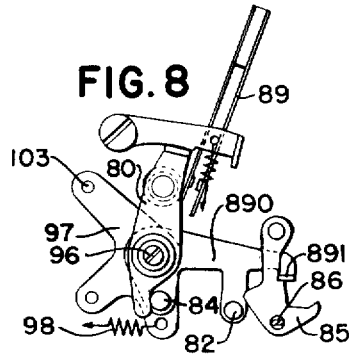
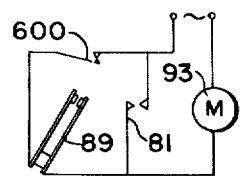
INVENTORS
NELSON R. FRIEBERG
& OSCAR F. LARSEN
THEIR ATTORNEYS

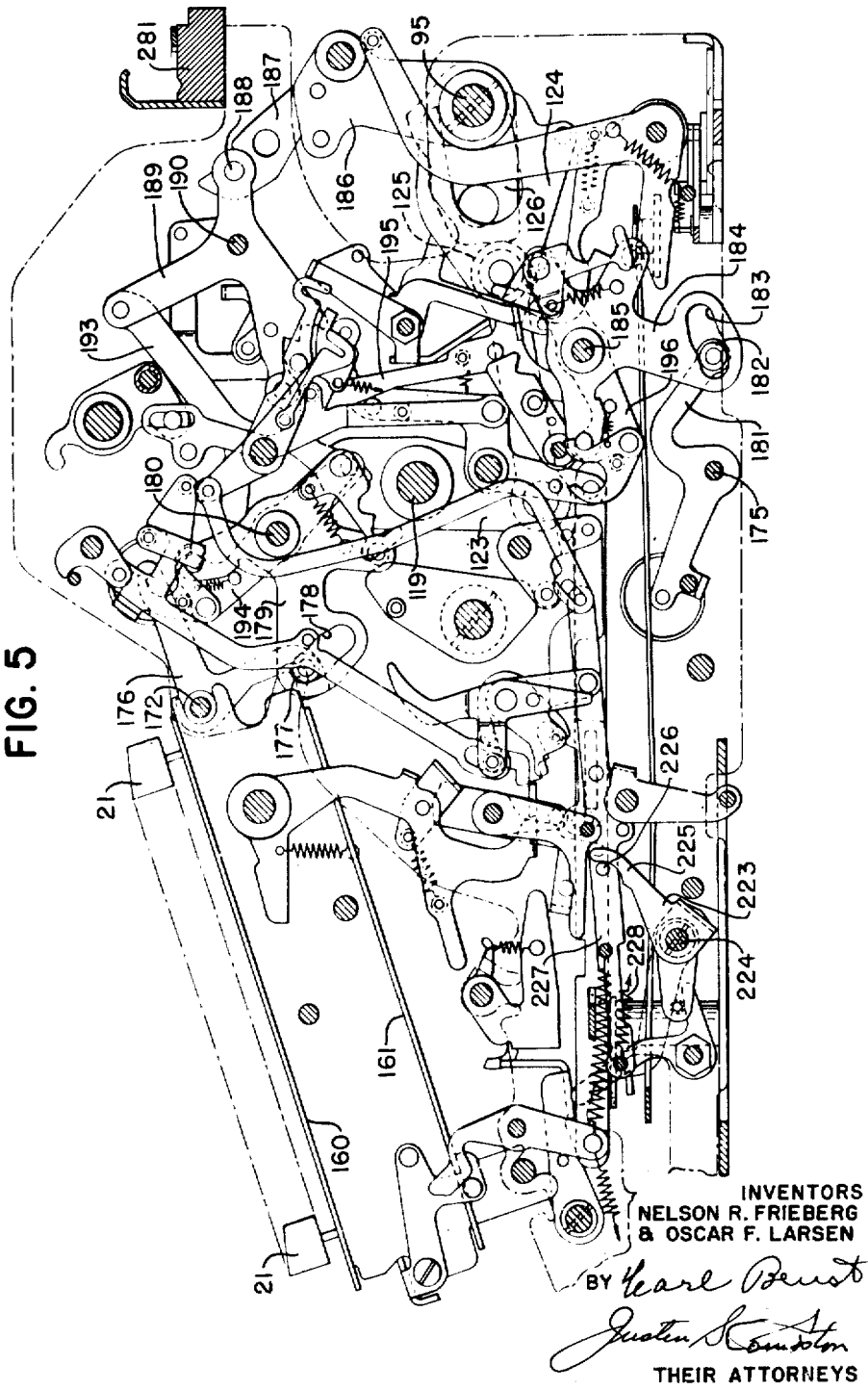

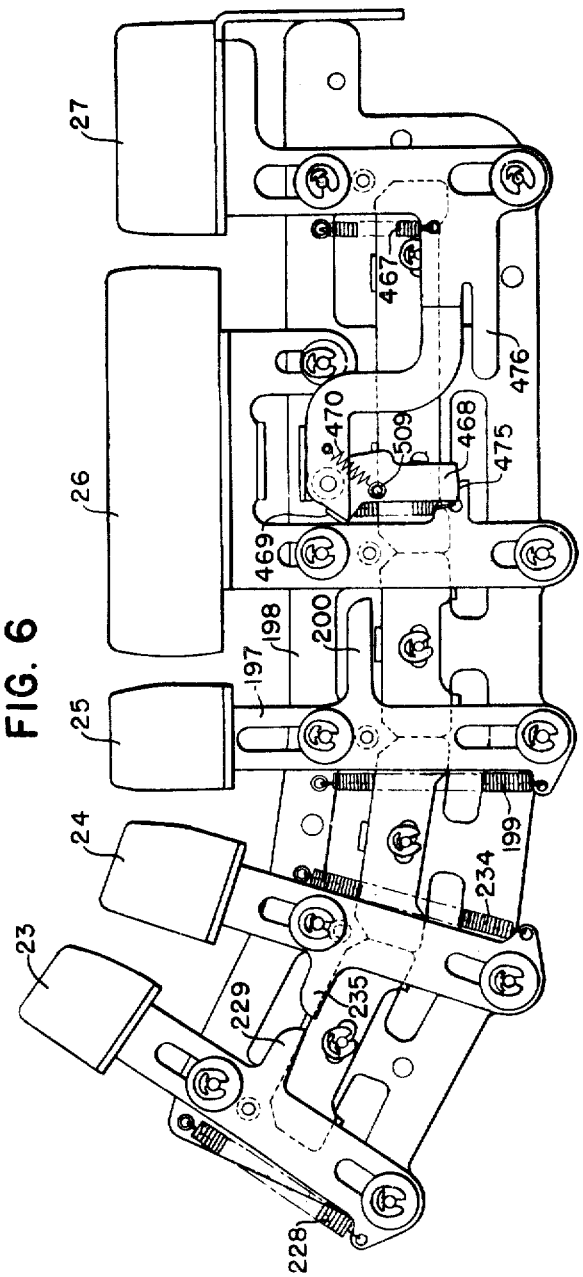

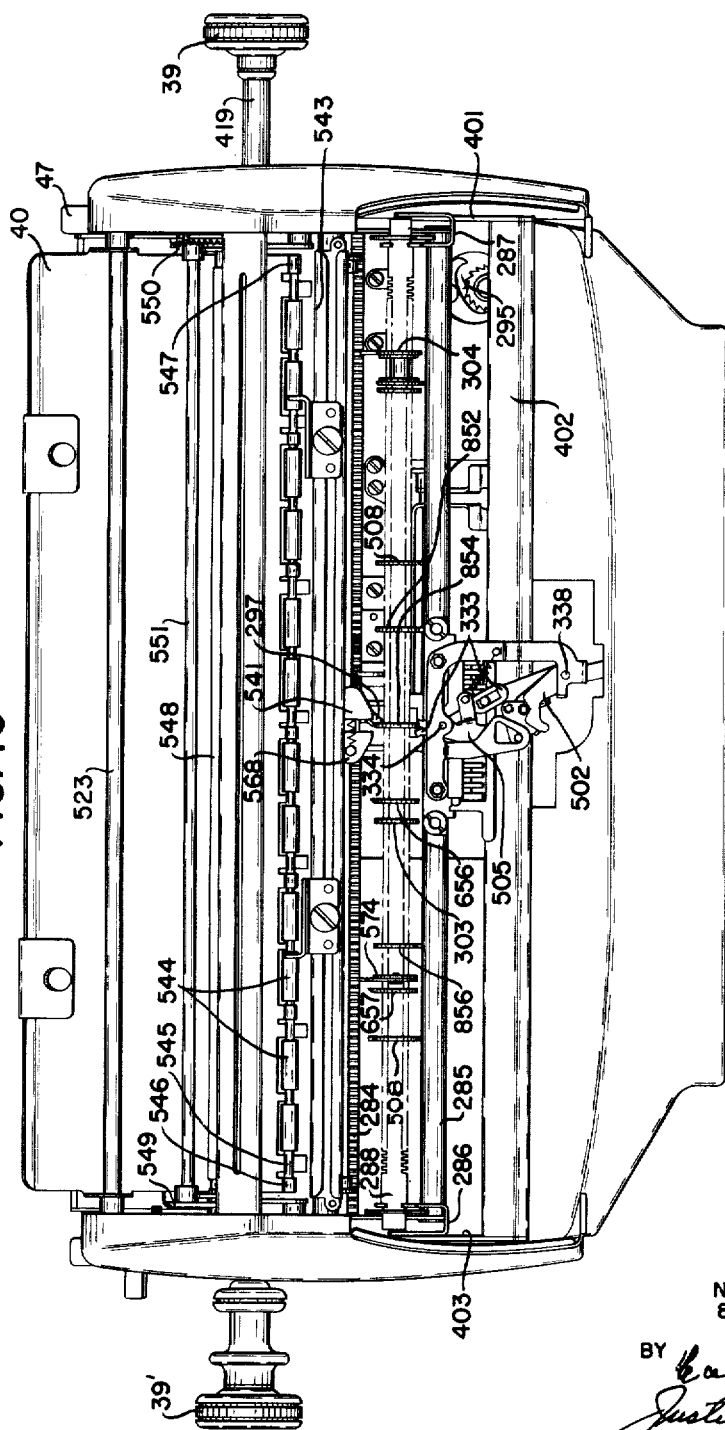

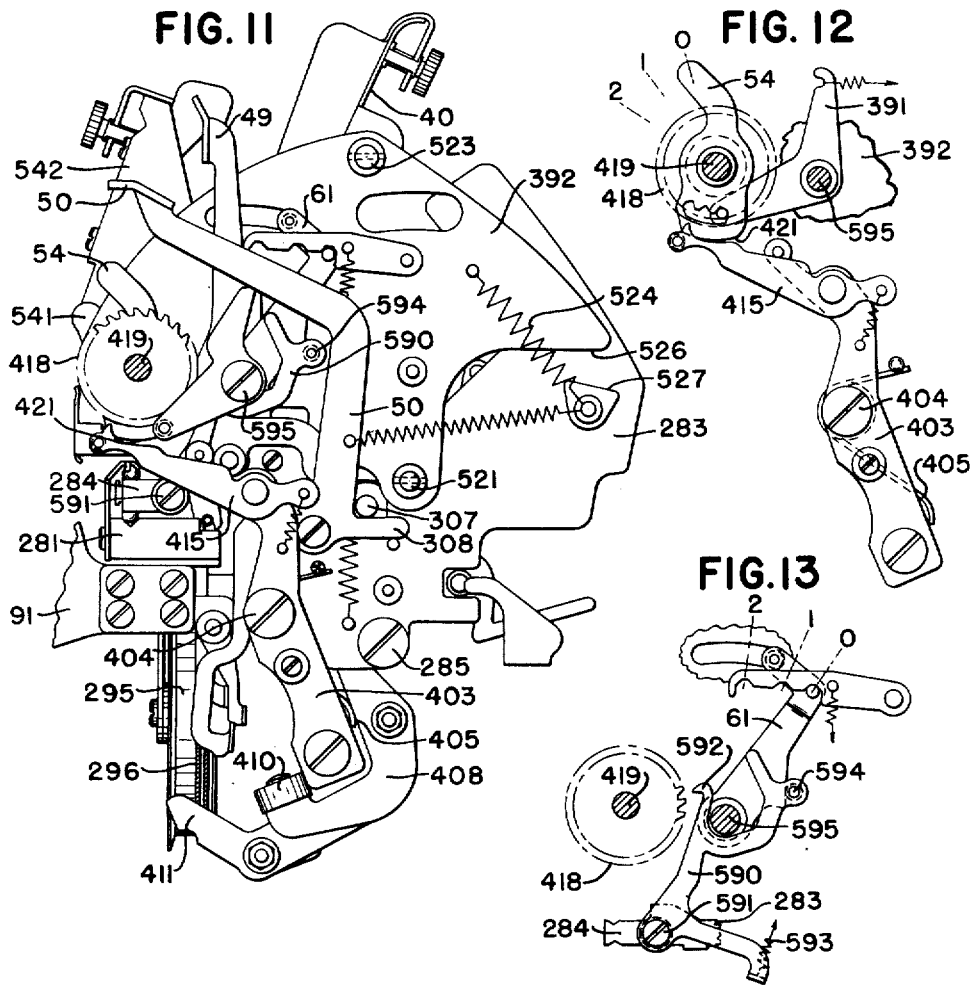

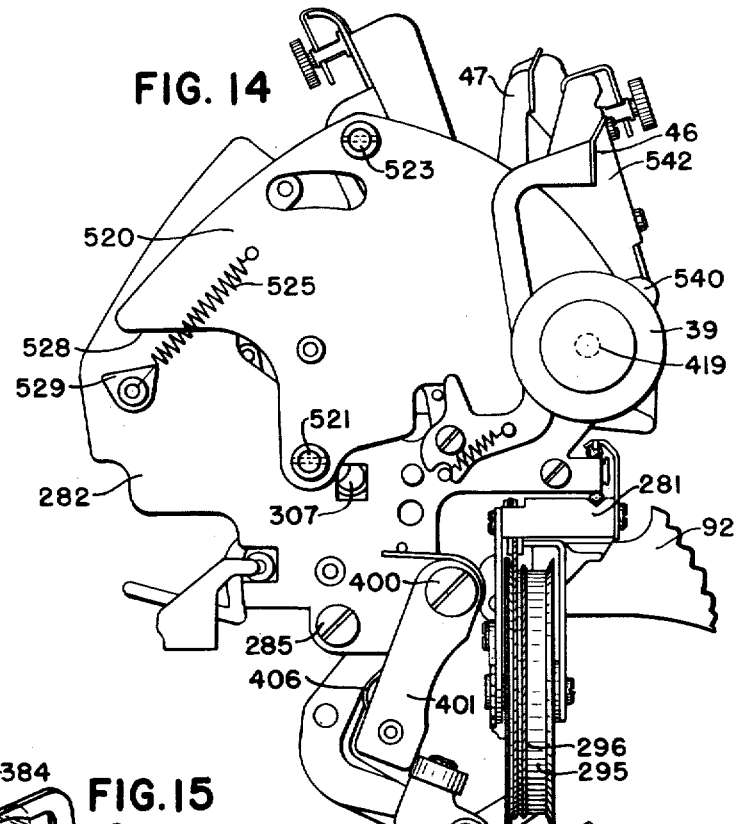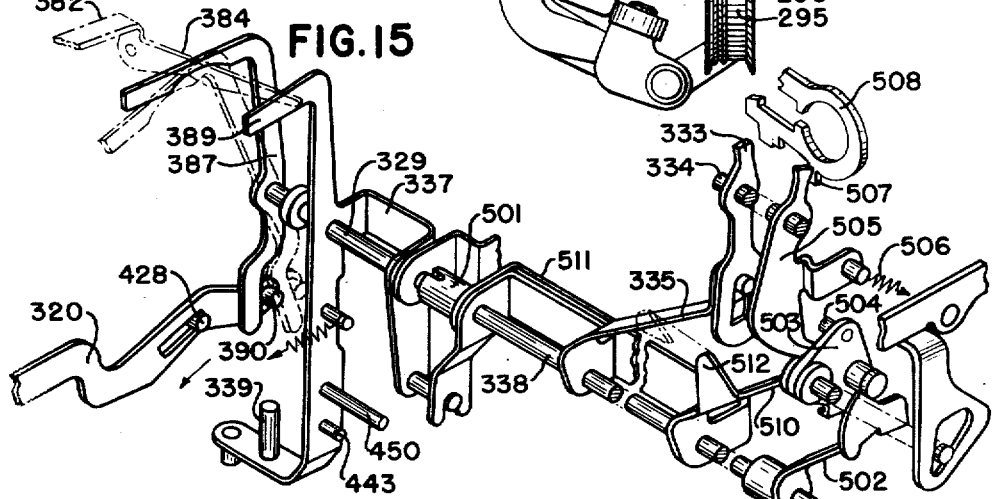

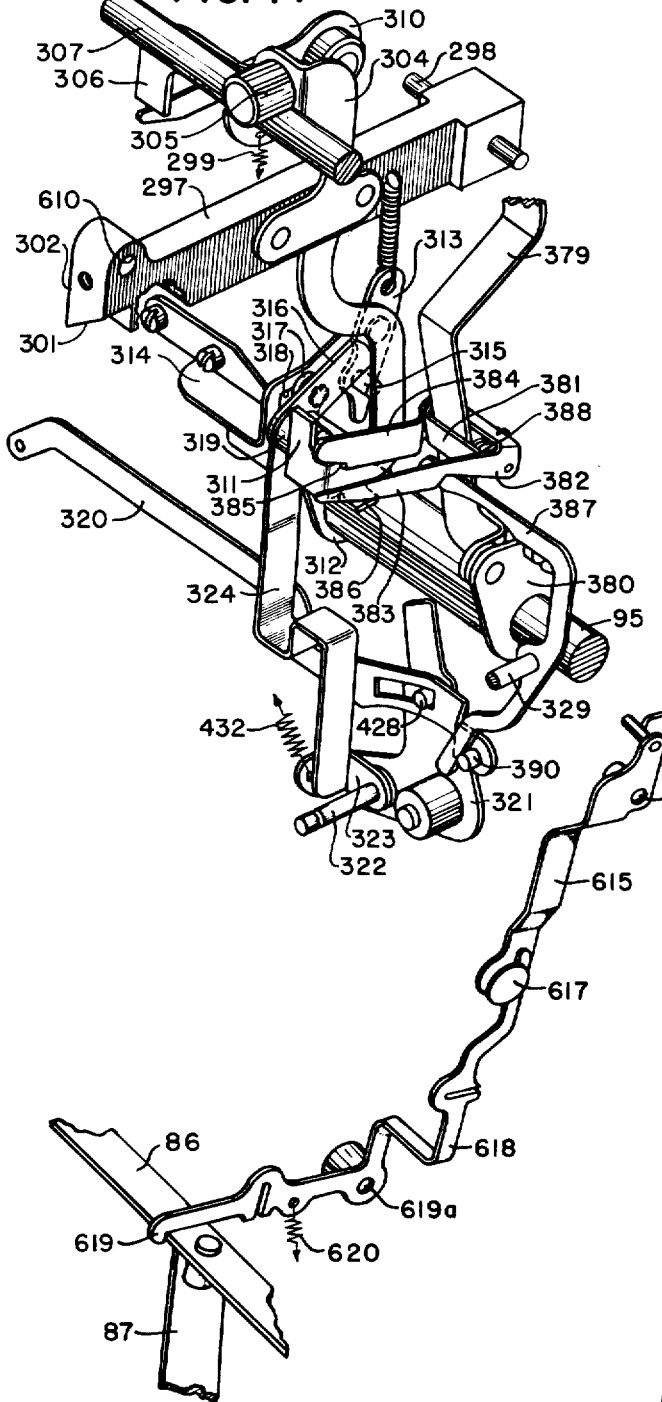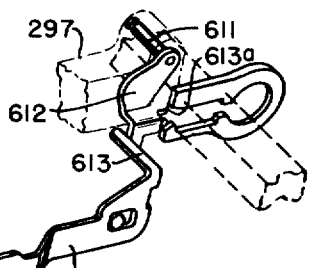

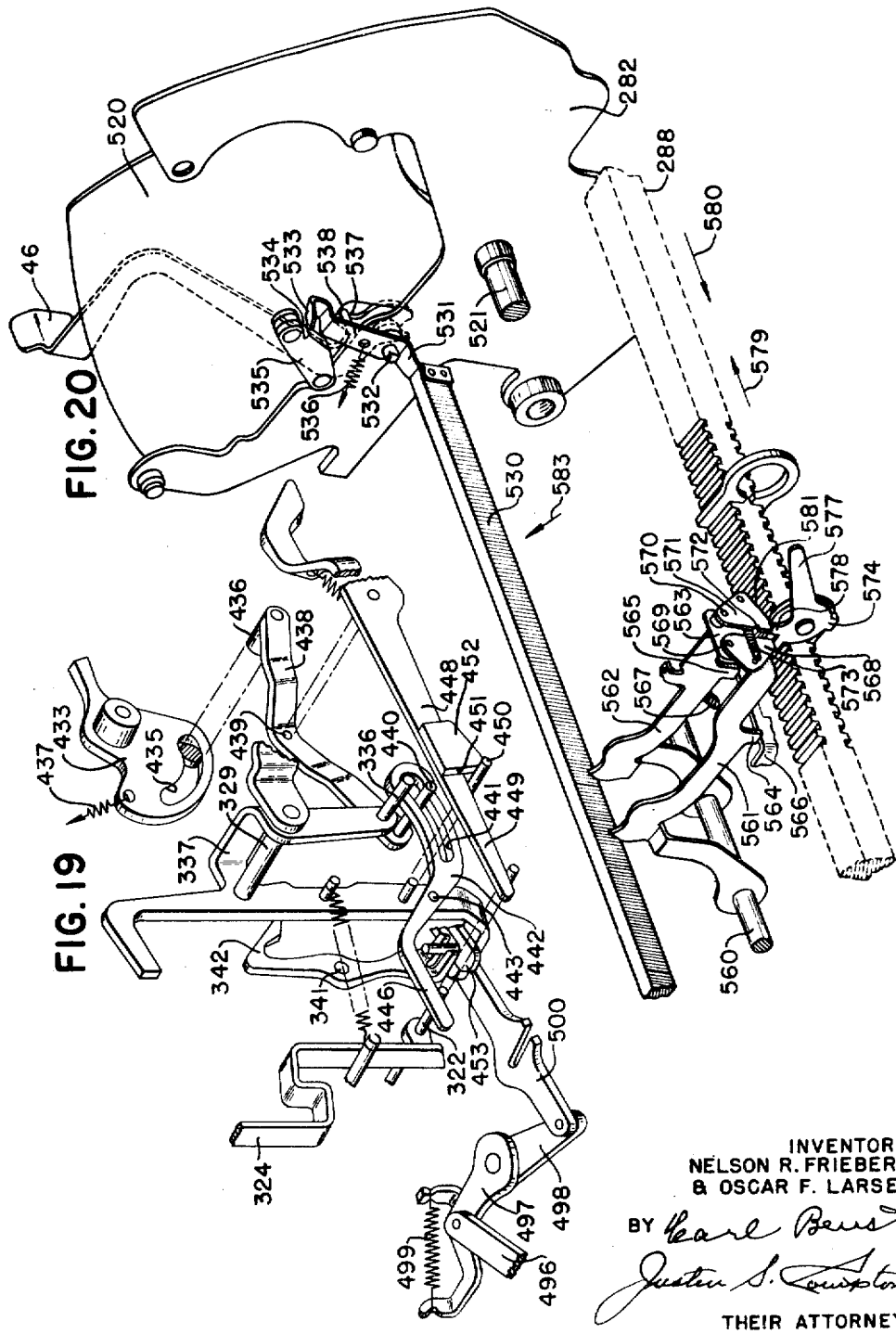

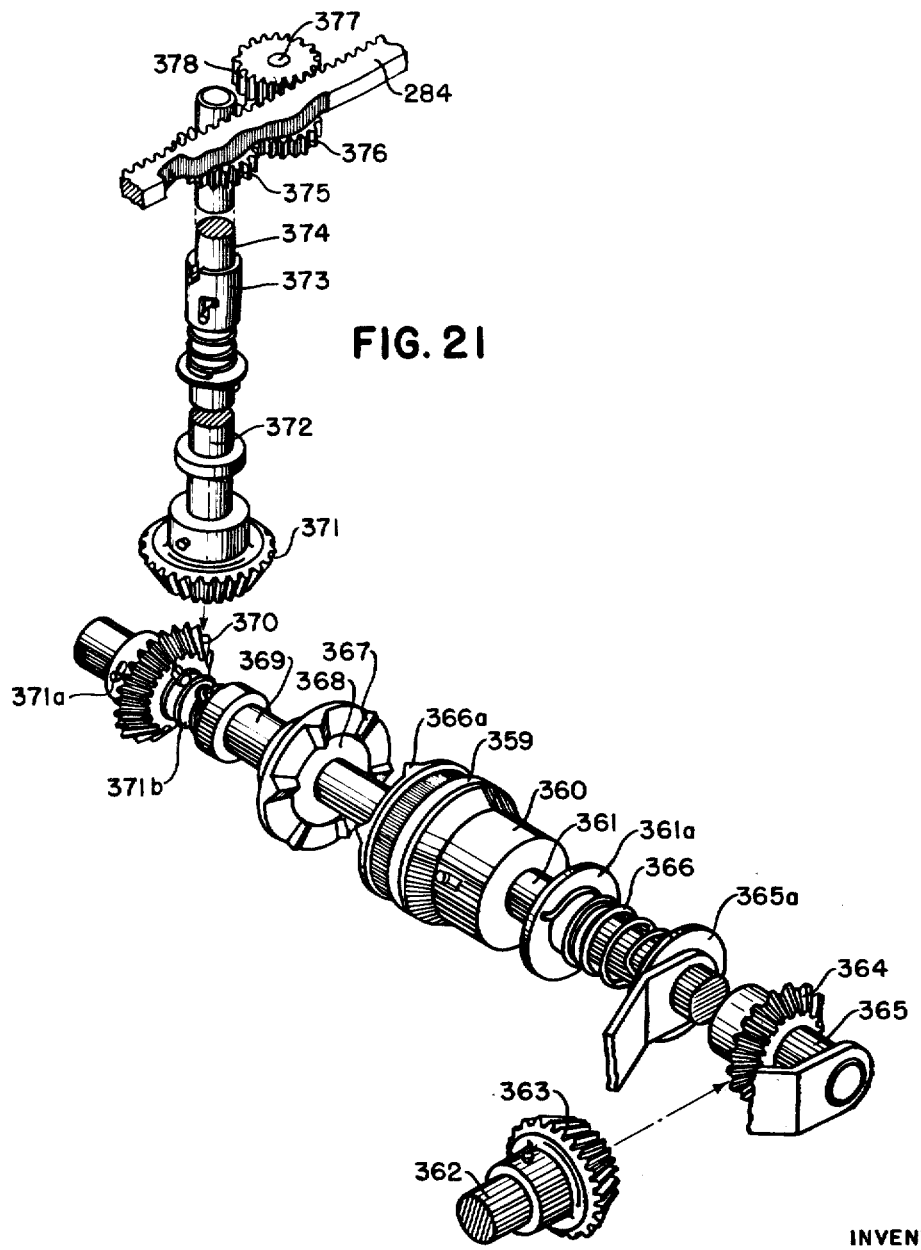

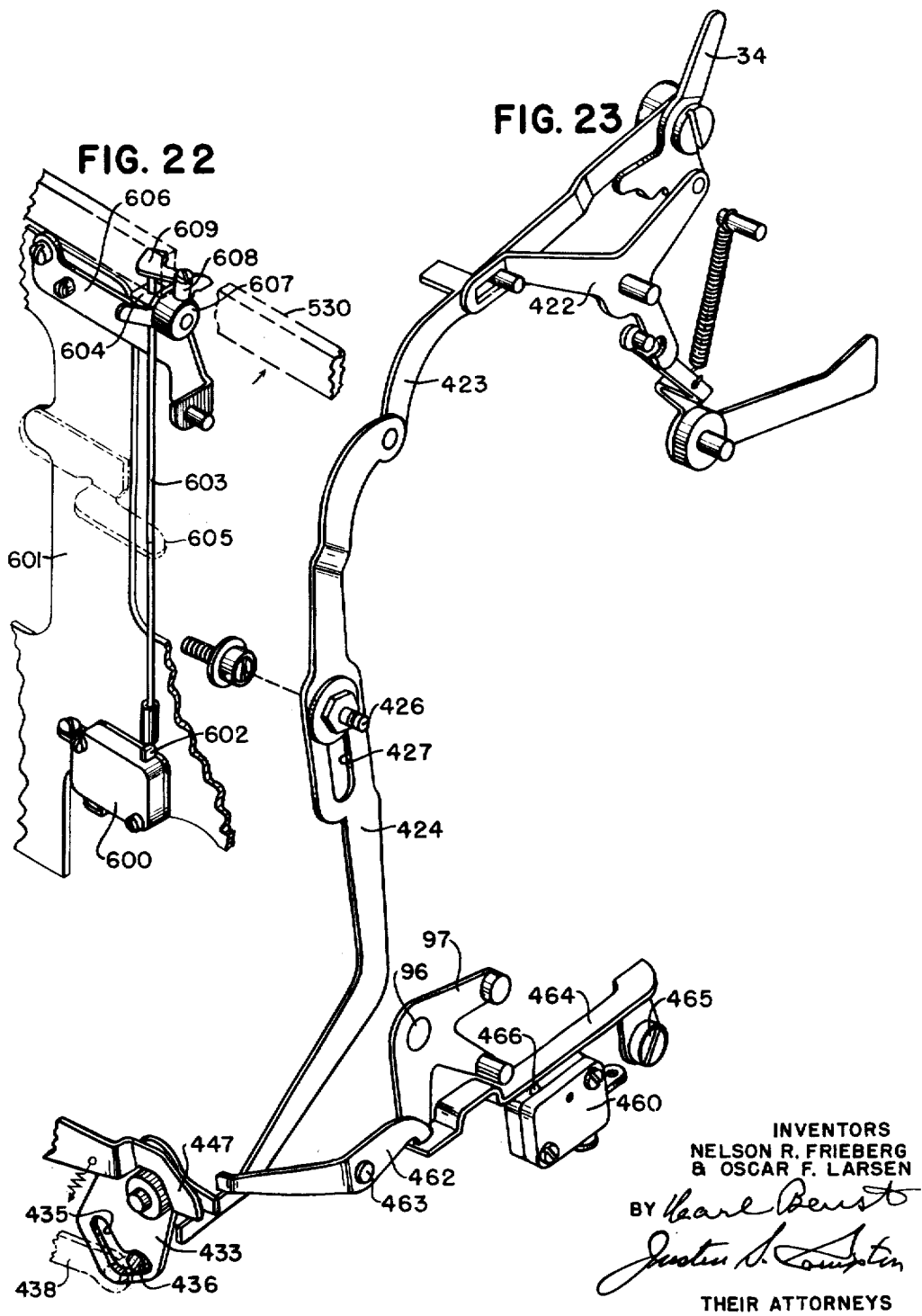

Nov. 19, 1957 N. R. FRIEBERG ET AL 2,813,611
FRONT FEED AND OPERATION CONTROL MECHANISM
FOR CALCULATING MACHINES
Filed Feb. 24, 1954 19 Sheets-Sheet 16
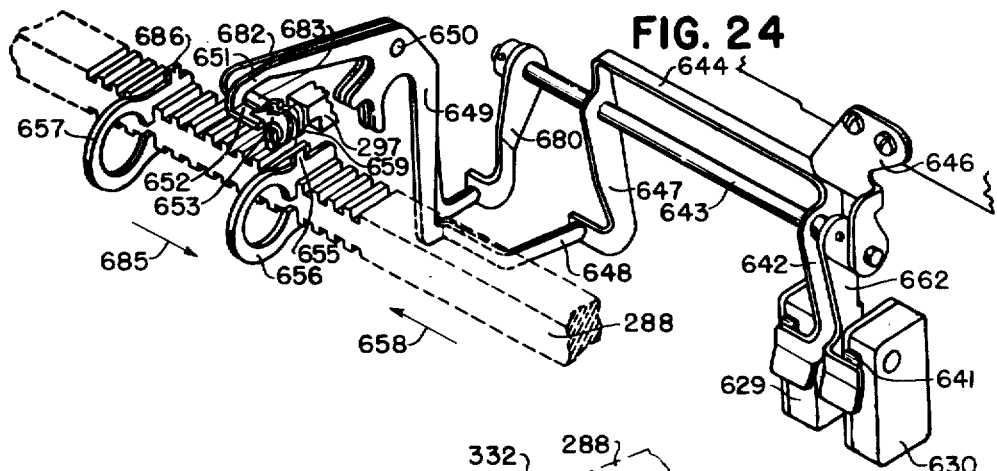
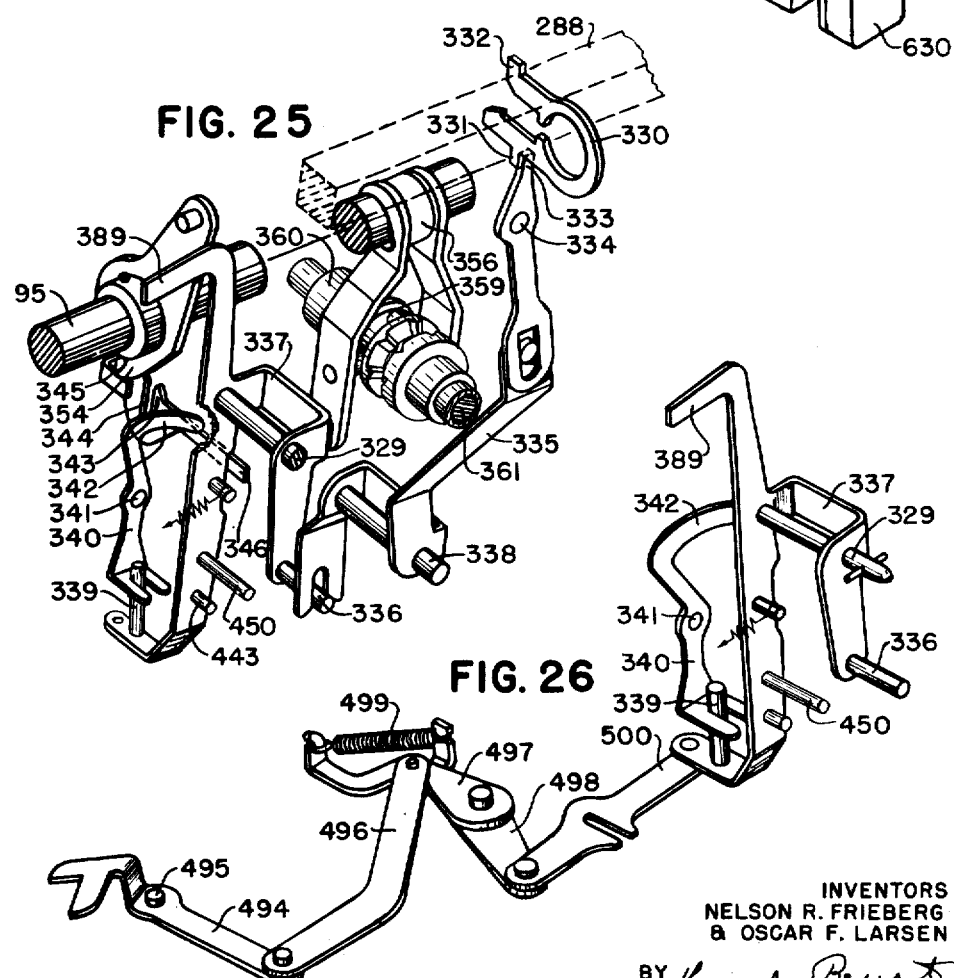
INVENTORS
NELSON R. FRIEBERG
& OSCAR F. LARSEN
BY Karl Berust
Justin S. Compton
THEIR ATTORNEYS

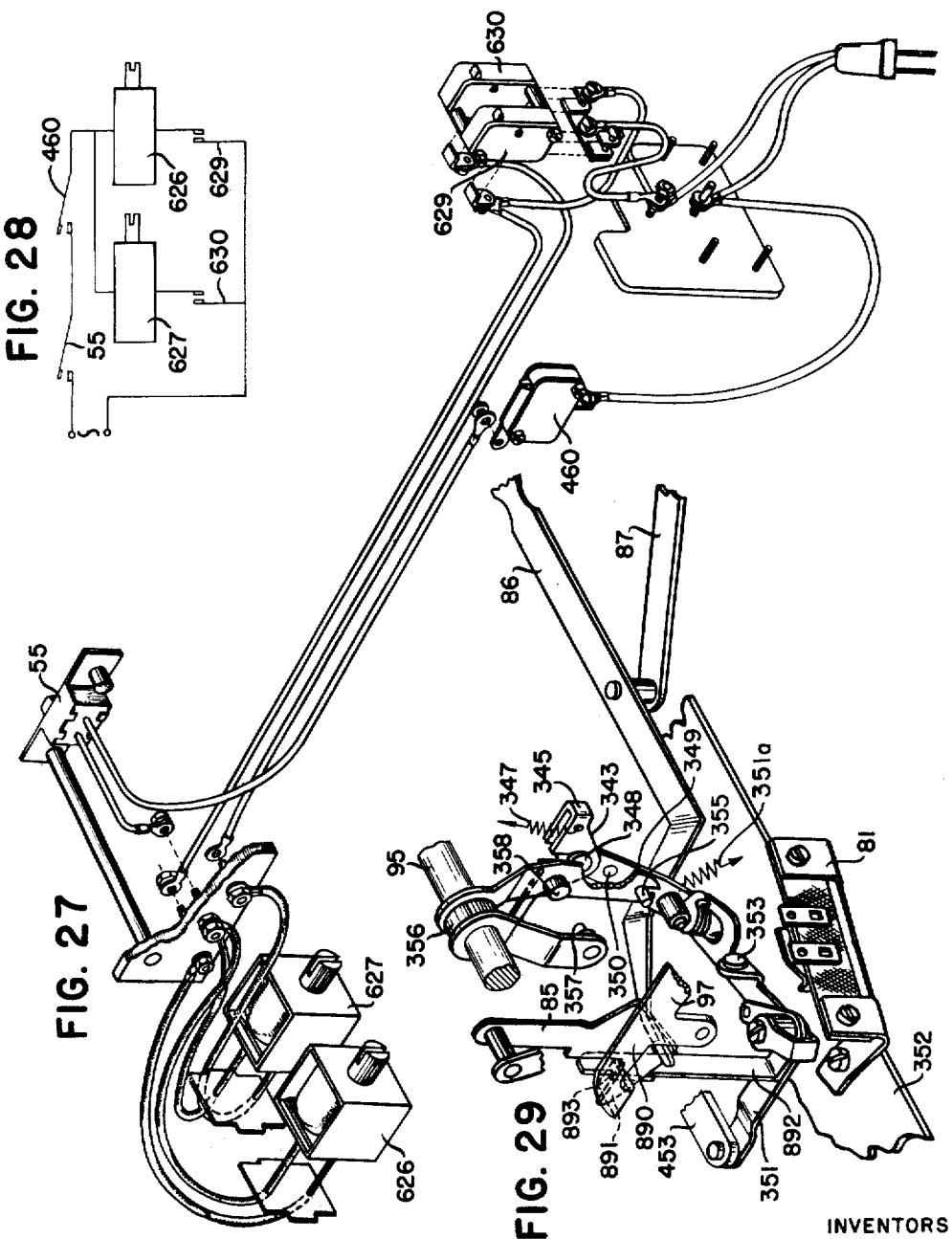

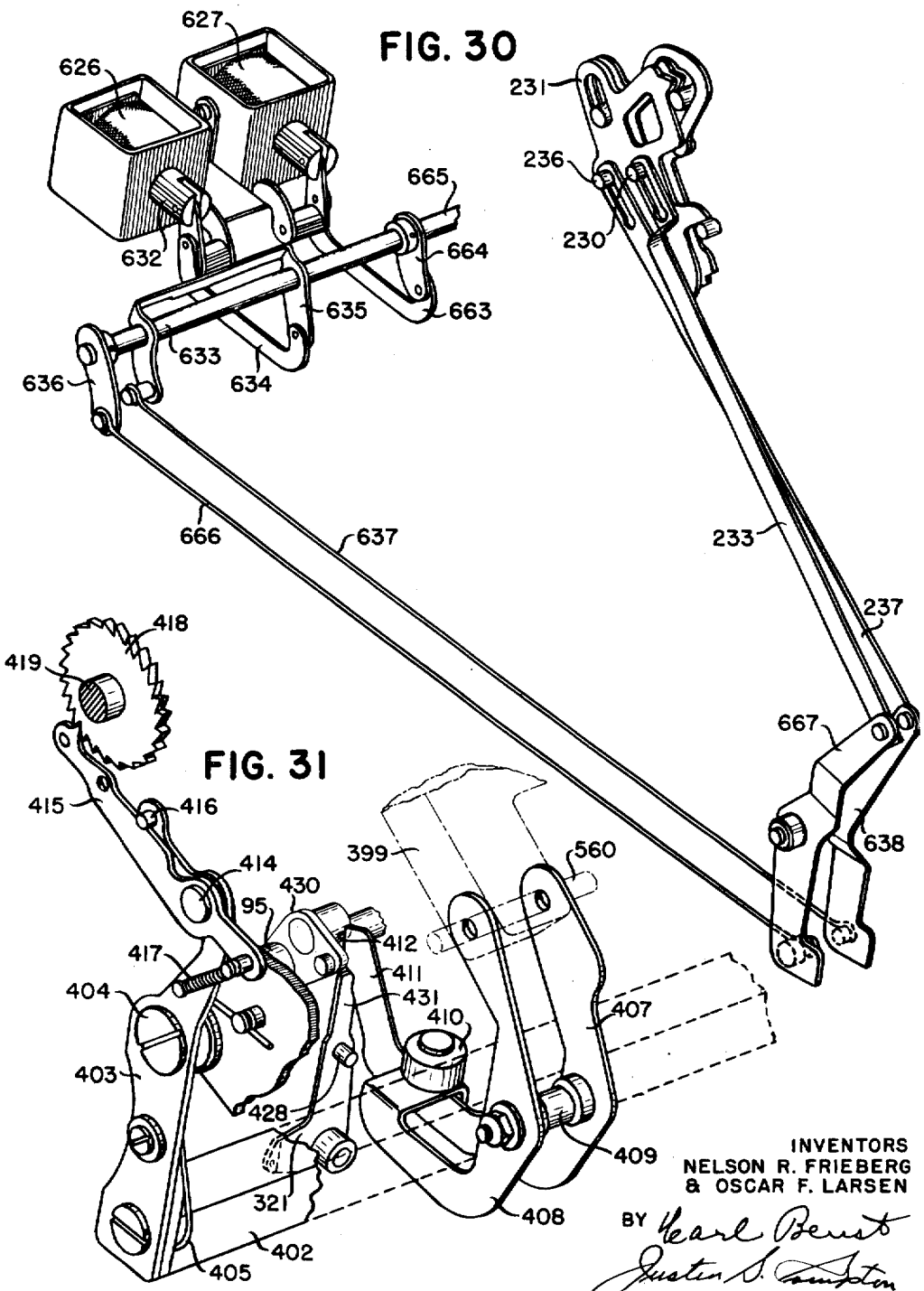

Nov. 19, 1957   N. R. FRIEBERG ET AL   2,813,611
FRONT FEED AND OPERATION CONTROL MECHANISM
FOR CALCULATING MACHINES
Filed Feb. 24, 1954   19 Sheets-Sheet 19

INVENTORS
NELSON R. FRIEBERG
& OSCAR F. LARSEN
BY
THEIR ATTORNEYS

United States Patent Office 2,813,611
Patented Nov. 19, 1957

2,813,611

FRONT FEED AND OPERATION CONTROL MECHANISM FOR CALCULATING MACHINES

Nelson R. Frieberg and Oscar F. Larsen, Ithaca, N. Y., assignors to The National Cash Register Company, Dayton, Ohio, a corporation of Maryland Application February 24, 1954, Serial No. 412,302

9 Claims. (Cl. 197—128)

This invention relates to a power-operated calculating machine of the type adapted for bookkeeping operations wherein debit and credit transactions are printed on one or more record sheets inserted in an automatic return cross tabulating and vertical feed paper carriage. The paper carriage is of the type having a platen around which a journal sheet may be wrapped by insertion from the rear, and is equipped with a front feed construction which may be opened to receive ledger and customers record sheets from the front, to cooperate with the journal sheet and be printed simultaneously therewith by manifold transfer means.

The basic construction of the machine is an add-subtract adding machine having two totalizers, automatic credit balance mechanism, automatic true positive or negative total-taking mechanism, and printing mechanism for printing entries and totals. The entries made into the machine either additively or substractively are entered into both totalizers, but the totals are taken from either one or the other of the totalizers.

The machine is equipped with automatic cross-tabulating mechanism and with automatic mechanism controlled from the moving carriage to variously cause an amount set-up on the keyboard to be entered into the totalizers positively or negatively, and to take automatic sub-totals and totals at selected positions of the movable carriage.

The carriage is automatically tabulated and returned with an accompanying opening of the front feed mechanism wherever desired, in either direction of carriage travel, whereby the ledger sheet and customer's statement may be withdrawn and replaced with another ledger sheet and another customer's statement.

The machine is equipped with mechanism for selectively determining from which totalizer a total is to be taken, and with mechanism for overcoming a subtract condition set up by the carriage so that an entry set up on the keyboard will be entered positively into the totalizers instead of negatively.

There is provided a number of selective controls for line-spacing the record materials vertically by means of the carriage opening and also by means of the mere operation of the machine. Manually operated means is provided for causing the carriage to space vertically upon a machine operation and if further operated to cause such vertical spacing to be accompanied by a return of the carriage to a pre-selected column.

Various controls are provided for rendering inoperative the normally automatic mechanism for tabulation, vertical paper-feed, automatic taking of sub-totals and totals, and automatic carriage opening.

Means is provided for printing dates and folio or reference numbers without entering the amounts so set-up into the totalizers. The printing mechanism is provided with controls which may be automatically or manually operated to prevent amounts that are set-up on the differential mechanism from being printed, or may prevent such amounts from being printed in certain denominational orders.

The carriage has in its front feed construction means for having it fully open, whereby record material is easily inserted from the front, and means for moving it from fully opened position to half-opened position, where the front-fed record material may be alined to the desired printing position.

A vertical spacing control is provided which suppresses the tabulating mechanism, so that the machine, instead of being conditioned for cross-tabulation, is conditioned for vertical listing of the record material, whereby the machine acts as an ordinary add-subtract listing machine.

Novel electric means is provided for opening the main motor circuit while the carriage is open.

Automatic disabling means for the automatic total-taking and sub-total-taking means is provided.

And certain novel features of carriage construction will be disclosed.

The novel construction provides symbol printing mechanism under selectively operable key control.

A full flexible keyboard of digit keys is provided to set-up entry data.

In the preferred embodiment of the machine, the automatic mechanism controls are set so that the carriage is automatically tabulated from a starting position as the various entries are being made on the record material, after which the carriage is returned to starting position accompanied by carriage opening. After an explanation of the preferred embodiment, the various changes which may be made in the operation of the machine will be explained.

Therefore, it is an object of the invention to provide a fully automatic, printing-calculating machine, capable of recording debit and credit transactions, and resulting new balances, all but the amount-setting-up functions being performed automatically.

It is another object of the invention to provide such a machine with a so-called full keyboard, that is to say, one in which there is provided a plurality of rows of amount keys, each of which contains the digits from 1 to 9 of the decimal system, or the digits of any other numerical denominational order upon which the machine may be based.

It is another object of the invention to provide an improved front feed carriage which is so constructed and so operated by the machine that, in addition to automatically tabulating to various printing columns under control of stops, it also automatically returns to initial position, and in addition it may be dominated by controls manually operable to overcome preset operating conditions.

The machine is constructed with novel mechanism for advancing the paper feed vertically by one or more lines under control of the machine operation with or without use of a vertical feed key, or under control of the carriage opening mechanism, or both.

A further object of the invention is to provide means by which the automatic mechanism may be disabled so that the totals and sub-totals are not taken automatically but are taken under control of the operator by manual means.

It is a still further object of the invention to provide such a machine in which the automatic controls may be so disabled that it may be used as an add-subtract machine with vertical listing of the transactions.

Another object of the invention is to provide a manually-operable, vertical-feed control, which overcomes the automatic tabulation of the machine during a machine cycle, so that instead of the horizontal adjustment of the paper carriage, relative to the printing station, the paper is fed vertically, and in addition, if the manually-operable vertical feed is held down to the end of an operation of the machine, the carriage is returned to the right to a predetermined position.

Another object of the invention is to provide selective means for causing the carriage to open either in the tabulating movement or in the return movement thereof, or both.

Means is provided to disable the power means for operating the entry mechanism when the carriage is open.

Various interlocking mechanisms of novel design are provided so that misoperation of the machine will be prevented, such interlocking mechanisms being between the various control keys and automatic mechanisms.

With these and incidental objects in view, the invention includes certain novel features of construction and combinations of parts, a preferred form or embodiment of which is hereinafter described with reference to the drawings which accompany and form a part of this specification.

Of the drawings:

Fig. 5 shows the mechanism for controlling the engagement of the totalizers, which mechanism is on the inside of the right vertical side plate.

Fig. 6 shows the control keys on the right side of the machine as situated in the suporting bracket on the inside of the right side of the casing.

Fig. 7 is a plan view of the base of the machine showing the mounting of the machine trip link and the total-taking and sub-total-taking solenoids.

Fig. 8 is a view of the machine trip lever and main motor switch.

Fig. 9 is a diagram of the main motor circuit.

Fig. 10 is a rear elevation of the carriage and associated mechanism.

Fig. 11 is an elevation of the right end of the carriage.

Fig. 12 is a detail of the machine actuated ratchet for vertical feeding of the record material.

Fig. 13 is a detail of the ratchet mechanism for vertically feeding the record material by carriage opening.

Fig. 14 is a left side elevation of the carriage.

Fig. 15 shows parts of the carriage return mechanism in exploded form.

Fig. 17 shows mechanism for disabling the tabulating stop bar on return of the carriage, and a portion of the vertical feed motor bar mechanism.

Fig. 18 shows a linkage whereby the machine can not be tripped when not in contact with a carriage stop.

Fig. 19 shows parts of the carriage return control mechanism for disabling automatic return of the carriage during listing operations.

Fig. 20 shows the carriage latch, the hand-operated lever for opening the latch, and the automatic means for opening the latch.

Fig. 21 is an exploded view of the motor-driven return mechanism, including the clutch.

Fig. 22 shows the switch mechanism for disabling the main motor circuit when the carriage is open.

Fig. 23 shows the listing and tabulating control and the mechanism for disabling the automatic total-taking and sub-total-taking mechanism during listing.

Fig. 24 shows the mechanism for closing the total-taking and sub-total-taking solenoid switches by carriage controls.

Fig. 25 is a perspective of the carriage return clutch and intermediate controls.

Fig. 26 shows a portion of the linkage for return of the carriage from vertical motor bar operation.

Fig. 27 is a modified perspective view of the solenoids and associated micro-switches controlling their energization and de-energization.

Fig. 28 is a wiring diagram of the substance of Fig. 27.

Fig. 29 shows the mechanism for locking the machine trip lever during return of the carriage, and the switch for energizing the motor for returning the carriage.

Fig. 30 is a perspective view of the linkage between the solenoids and the total slide and the sub-total slide.

Fig. 31 is a perspective view taken from the right rear of the machine, looking forward to the machine-operated vertical feed pawl and ratchet, with the blocking means for the feed bail shown in relation thereto.

*Description of the functional operation of the machine*

Figure 1:
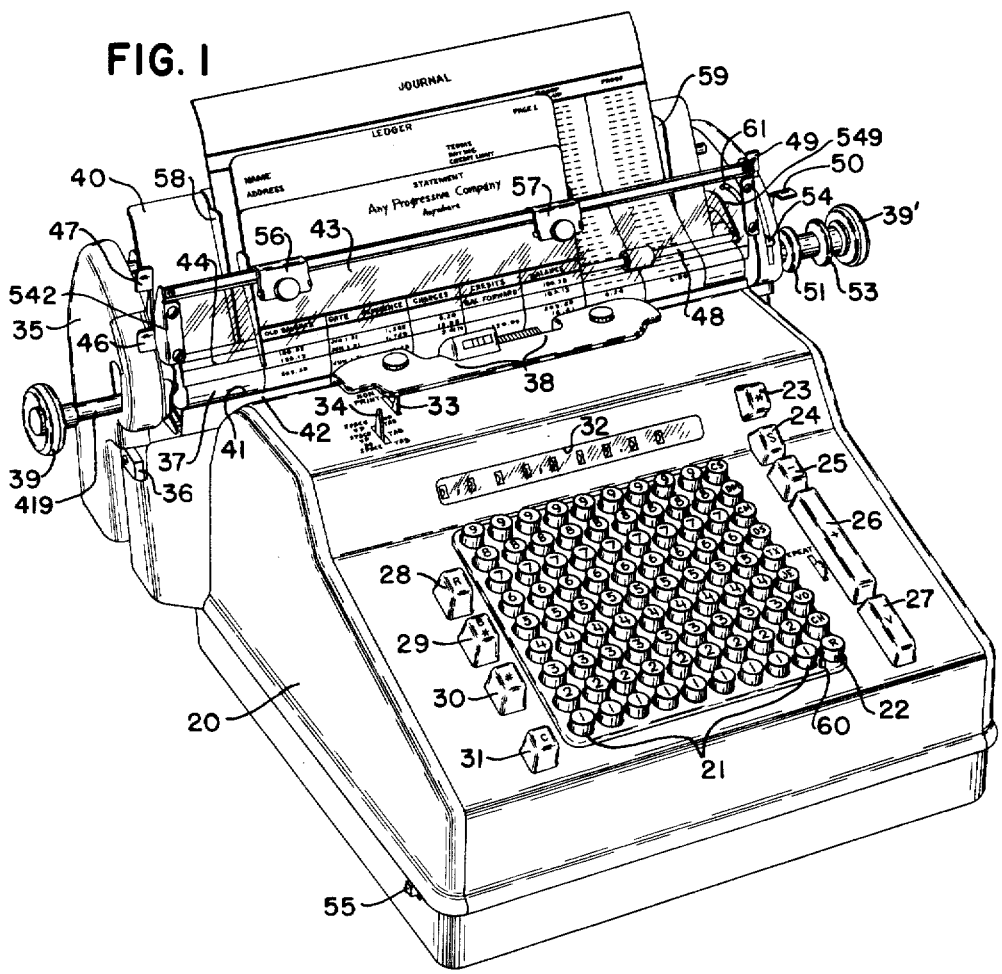
Fig. 1 is a perspective view of the machine with a journal sheet, ledger sheet, and customer's statement, in place around the record material platen.

Referring to Fig. 1, the machine framework and mechanism, to be described, is covered by a casing 20, through which project 9 rows of digit keys 21, a row of symbol keys 22, a total key 23, a sub-total key 24, a subtract key 25, an add motor bar 26, a vertical feed bar 27, a reverse key 28, a "B" total key 29, a non-add key 30, and a correction key 31. The casing has a viewing aperture 32, through which may be seen number drums attached to the totalizer wheels of the upper, or "A," totalizer, the wheels of the "B" or lower totalizer being invisible. There is provided a lever 33, having a forward position in normal printing operations, said lever being movable to the rear where it prevents the printing of items or totals. A spacing and tabulating control lever 34 is provided, it being movable to any one of three positions, the forward position controlling the paper feed and tabulating mechanisms so that upon each operation of the machine there is no automatic vertical spacing by reason of machine operation, but the machine tabulates according to the control stops to be described. If this lever 34 be moved rearwardly one position, the paper will be fed upwardly on each machine operation, and will tabulate according to the carriage stop controls. If the lever 34 is moved to its rearmost position, the paper will feed vertically on each machine operation, but the carriage will not tabulate. The automatic cross-tabulating carriage 35 is supported upon carriage support rail 36, and is constantly spring-urged toward the left and will be stopped in various printing positions by control stops, which may or may not also control the type of machine operation. If such stops are not present, the machine will move completely to the left against a limit stop. Stop controls are provided on the carriage to operate the carriage return mechanism so that at the end of a series of entry operations the carriage will be clutched to actuating mechanisms which will return it to its rightmost position, or to a selected position as controlled by the carriage stops. The tabulating mechanism will be fully described in detail in what follows. The vertical motor bar, when held down, returns the carriage to a predetermined stop.

A platen 37 is provided for supporting record material in a manner to present it to the printing type 38, which at the proper moment of a machine operation moves rearwardly and prints the entries or totals on the record material held around said platen. The platen may be rotated by knobs 39 and 39' to move the record material in a vertical direction, either up or down, pressure rolls to be described holding the paper whereby the frictional contact with the platen will cause it to move. The machine is provided with a paper table 40 to the rear of the platen, and the journal sheet is inserted between the table 40 and the rear of the platen, and wound around until it comes through the throat 41, upon the turning of knobs 39 and 39', the paper being held in frictional contact with the platen by the pressure rollers. The throat 41 is formed by the platen 37 on one side and pressure plate 42 extending across the platen and ordinarily held in resilient contact with the platen. A front paper table is formed by a transparent plate 43, held in the framework so that when the carriage is open the table will swing forward and downward carrying pressure plate 42 away from the platen, and at the same time releasing the pressure rolls on the underside of the platen, which will be described, so that the ledger and customer's statement may be inserted between pressure plate 42 and the platen 37 and between the platen and the pressure rolls from the front. The front paper table 43 may be closed to a half-open position where a guide line 44 comes into view and the front pressure rolls release, and the record material may then be alined on this line at the next printing position. The carriage is then fully closed, which closes the pressure plate 42 and pressure rolls against the platen, and the machine is ready to operate. The front feed opening movement is actuated by springs which are tensioned as the carriage is moved to closed position. The carriage is held closed by a latch which engages automatically when the carriage is closed by the operator. A front feed opening lever 46 is provided, said lever when pushed back unlatching the carriage, allowing it to open fully. As indicated, there is an intermediate latch point which will hold the paper table 43 in partly closed position. Carriage opening stops may be provided and, in the preferred embodiment, one is provided to open the front feed throat at the beginning of the carriage return operation. The operation of lever 46 which unlatches the carriage latch, and the subsequent front feed opening of the throat, releases the front pressure rollers so that the paper may be inserted underneath the platen and out on a back paper table 543 (Fig. 10). A journal sheet release lever 47, when moved rearwardly from a normal forward position to a first-moved position raises a paper bail 48 having upper pressure rolls which bear against the journal sheet. If the lever 47 is moved backward further, to a second moved position, the paper bail is raised further and the back pressure rolls are released so that the journal sheet may be alined properly. The first moved position is for use when inserting the journal around the platen, the pressure rolls being in engagement, so that they will seize the inserted sheet, the paper bail being raised so the sheet may be guided under it. When the customer's statement and ledger sheet is inserted after opening the front feed throat, the lever 47 must be in the forward position. On the right side of the machine is provided a front feed form release lever 49, which when pulled toward the front of the machine, releases the front pressure rolls and thus releases the front-fed forms in the carriage, permitting free movement of them so that they may be alined at the exact posting line by aid of guide line 44.

Also on the right side is a carriage release lever 50 which, when pressed down, disables the tabulating stop bar, permitting the carriage to move in either direction, regardless of the intermediate stops, so that when the lever 50 is released the carriage will move against the stop that is next met on the movement of the carriage to the left. The carriage can be moved to the right without pressing any lever. Vertical line-spacing is controlled by the movement of clutch part 51 to which is secured a line-spacing ratchet, to be described later, and is connected to the paten shaft 419 (Fig. 11), by a second clutch part 53, splined to shaft 419, and held in contact with clutch part 51 by a spring. Outward movement of clutch part 53 against the action of the spring disengages it from part 51 so that the platen may be rotated for variable line spacing without regard to the movement of clutch part 51. Clutch part 51 is solid with a vertical space-up ratchet wheel, which is given a step-by-step movement each time the machine operates, and each time the front feed paper table is opened to fully opened position, except that controls are provided to regulate the vertical feed movement by the machine operation to no movement at all, or to one or two spaces per machine operation, and there is provided a lever 54 which may be selectively moved to accomplish this control. Another lever 61 controls the amount of vertical spacing when the carriage opens so that by its selective use the platen will not vertically space at all or will space either one or two spaces according to the adjustment thereof. The machine is equipped with electro-mechanical means for taking sub-totals and totals in certain column positions, automatically, by reason of special stop controls which operate solenoids. An electric switch 55 is provided to break the electric circuit which supplies electric power to the solenoids to disable such automatic taking of sub-totals and totals, if so desired.

Paper guides 56 and 57, slidably mounted on the upper edge of the front paper table are adjustable to accommodate the width of the customer's statement and ledger sheet so that proper alinement of them with respect to the journal sheet may be had. On the rear paper table 40 (Fig. 1) are adjustable paper guides 58 and 59, which may be selectively positioned to aid in the insertion of the journal sheet with respect to the customer's statement and ledger sheet.

Preliminary to a description of the mechanism of the machine, a brief summary of a typical operation will be described. The paper carriage front feed is opened to its full extent and the journal sheet is inserted between the platen 37 and the rear paper table 40 and wound around the platen by use of knobs 39 and 39', the lever 47 having previously been moved rearwardly to its first position to position pressure plate 42 against the platen and raise the paper bail 48 so that the top of the journal sheet may pass thereunder. The journal sheet is turned to the approximate position at which the entries are to be started and the lever 47 is pushed further rearwardly to the second moved position, and, by hand, the journal sheet is adjusted as to vertical and horizontal alinement, whereupon the lever 47 is drawn forward to normal, which causes the paper bail 48 to drop against the top of the journal sheet, holding it against the platen, and causing the rear pressure rolls to hold the bottom of the journal sheet against the platen, so that movement of the platen shaft in a rotary direction will move the journal up or down, as desired. The front feed throat is then open. The ledger sheet and customer's statement sheet are held together and then fed around the platen by sliding it between the guides 56 and 57 on the now opened transparent paper table 43, and inserted beneath and around the platen. The paper table 43 is moved toward closed position where it is held halfway by a latch, and the ledger and customer's statement are alined by means of guide line 44 so that the next printing line is in alinement therewith. The paper table is then closed, which closes the throat and the carriage is moved, by hand, so the left-most printing column is opposite the printer 38. By use of lever 49, the front fed record material is released if further adjustment is required. The printing columns are determined by the tabulating control stops in the rear of the machine, to be later described, and in the preferred embodiment shown the printing columns are, reading from left to right, the Old Balance column, to which the carriage is moved, by hand, for the first entry. The next printing position, as the carriage moves to the left, is the Date and Reference, or Folio, column; then, in turn, the Charge column, the Credit column, the Balance column, the Proof Pickup column, and the Proof column, which is the last column to be printed. The ledger sheet and customer's sheet do not extend over the last two columns. The carriage being in the Old Balance column, the old balance is noted from the last ledger item for the customer, is set-up on the digit keys and the add motor bar 26 is depressed. This sets the machine in operation, entering into both the upper, or "A," totalizer, and, into the lower, or "B" totalizer, the old balance amount which is printed at mid-cycle. The carriage automatically tabulates to the Date and Reference column. Previously, for a series of transactions, the month, day and year, are set-up on the rotary date wheels, which are to the left of the printer, the reference number is set-up on the dollar keys of the keyboard, the cents keys being suppressed by a printing hammer control means, and the machine is operated by means of the motor bar 26, printing the date and reference number, but not adding anything into either totalizer as a non-add control stop, at this point, prevents said totalizers from being engaged with the actuator racks to be described. The machine then tabulates to the Charge column and, if there is any charge, the amount is set-up on the digit keys and the motor bar 26 is operated, causing a machine operation in which the amount set-up on the keyboard is entered into both totalizers additively. If desired, one of the keys, which operate the symbol type, on the right side of the keyboard is depressed, indicating the nature of the charge. As seen in the preferred embodiment, the top key, which bears the symbol "CS" is for a cash entry, a second key from the top bears a symbol "DM," which indicates a debit memo, a third key from the top bearing the symbol "CM" indicates a credit memo, the fourth key from the top bearing the symbol "DS" indicates a discount, the fifth key from the top bearing the symbol "TX" indicates a tax entry, the sixth key from the top bearing the symbol "JE" indicates a journal entry, the seventh key from the top bearing the symbol "VO" indicates a voucher entry, and the eighth key from the top bearing the symbol "CH" indicates a charge entry. The bottom key in the row bearing the symbol "R" is a repeat key, and if it is pushed down, together with another one of the keys of the row, and latched there by a latch 60, the selected symbol will print on each subsequent entry operation.

If there is more than one charge entry, the vertical motor bar 27 is used instead of the add motor bar 26 to suppress tabulation, to make the first entry. Then on operation of the machine and the printing of the entry, it will vertically space so that an additional entry may be made in the "Charge" column. If the vertical motor bar is held down through the end of the cycle, the tabulation not only is suppressed but also the carriage will move to the right one position so that a new date and folio entry may be made. Then the carriage tabulates to the "Charge" column. This may be continued as long as there are multiple charges in the transaction. On the last charge entry, if there be more than one, the add motor bar 26 is used, which automatically tabulates the carriage to the "Credit" column, in which position of the carriage a stop thereon conditions the machine for a subtract entry. The credit is then set-up on the keys in conjunction with one or more of the symbol keys, if desired, and the motor bar depressed, entering the credits subtractively. As with the "Charge" column, the vertical motor bar 27 may be used to enter more than one credit in the transaction, as was the case with the "Charge" column. On the entry of the last credit, by use of the add motor bar 26, the carriage tabulates to the "Balance" column, in which an automatic sub-total is taken of the upper, or "A" totalizer, normally being printed in black for a positive balance but printed in red with a negative sign, if the balance is a negative balance, and the carriage tabulates to the proof pick-up column on the journal sheet, the tabulating stop controlling such column, conditioning the machine for subtraction. The old balance is again entered on the keyboard and the add motor bar 26 is operated, which automatically subtracts the old balance from the amount in the totalizers and tabulates the carriage to the proof position wherein the total is automatically taken, and the machine is started on its return to the "Old Balance" column, while the front feed throat and paper table are thrown open on the return travel so that the customer's statement and ledger sheet may be withdrawn, the journal automatically spacing up at the same time, one or more spaces, under control of the spacing control levers 54 and 61, or not at all, depending on the position of said lever. A new customer ledger and statement is inserted in the machine, alined, and entries made thereon, as has just been described. At the end of a day's work, or at the beginning of the next day, the grand total is taken from the "B" totalizer. The upper totalizer should have been cleared out by the last operation. The "B" total may be taken by moving the carriage to the Old Balance position, moving the lever 34 to the non-tabulating position, that is to the listing position, depressing the "B" total key 29, followed by depression of the total key 23.

Where it is desired to print numbers without adding them into the totalizer, this may be done by use of the non-add key 30 which conditions the machine for non-adding and also tripping the machine to cause a cycle of operation.

In the description which will follow, the different possible combinations of tabulating stops and controls will be described with reference to the type of machine operation control mechanism, in detail.

The main operating means

The various elements of the machine are supported by a base 79 (Fig. 7), a right side frame plate 91 (Fig. 2), and a left side frame plate 92 (Fig. 3) cross-braced by numerous cross-rods and special braces, and supplied with various brackets upon which the machine elements are secured, as will become apparent.

Figure 3:
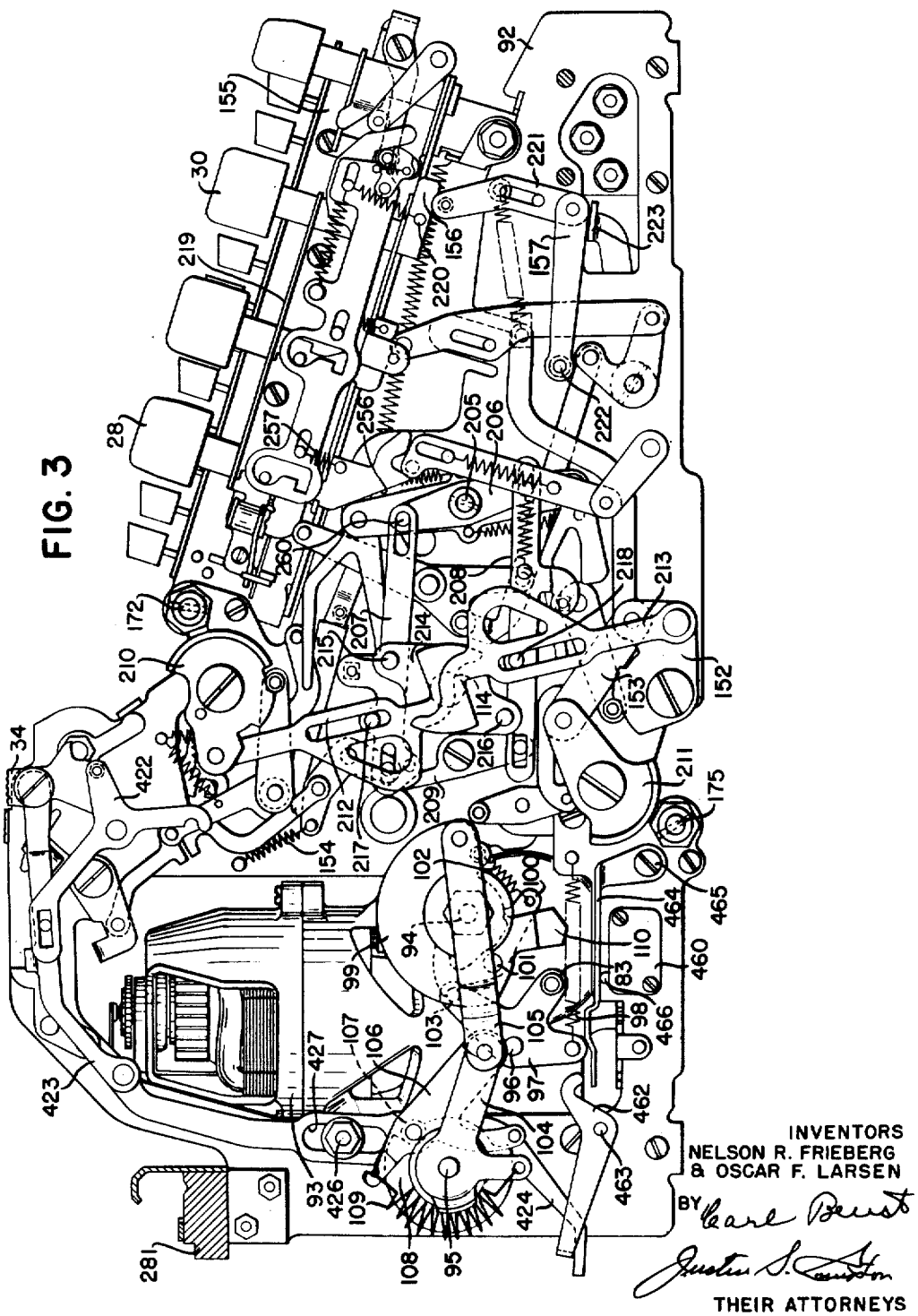
Fig. 3 is a left side elevation of the machine with the casing and carriage removed.

Referring to Fig. 3, the machine is equipped with an electric motor 93, which drives the machine through cycles of operation under control of cycle control means, and which also returns the carriage to its rightmost position under control of the selectively-placed carriage tabulating stops and associated mechanism.

The motor, through reduction gearing, drives a motor shaft 94 (Fig. 3) to operate the main operating mechanism under control of the single-cycle mechanism.

The main operating drive, including the motor 93, the motor switch 89 (Fig. 8), the tripping mechanism and the single-cycle clutch mechanism, is substantially the same as that disclosed in applicants' co-pending application for United States Letters Patent, Serial No. 349,228, which issued on October 26, 1954, as Patent No. 2,692,726, and to which reference is directed. The machine is tripped by clockwise rocking of trip lever 88 (Fig. 2) which pulls forward on a link 87 (see also Fig. 7) pivoted to a lever 86 pivoted at its right end to the base of the machine and having on its left end a finger-like portion which fits into an opening in trip latch 85 (see also Fig. 7) pivoted on part of the machine frame. The rocking of trip lever 88 (Fig. 2) rocks trip latch 85 (Fig. 8) clockwise allowing three-armed lever 97, mounted on shaft 96, to rock clockwise as seen in Fig. 8 and counter-clockwise as seen in Fig. 3, under urge of spring 98. The stud 84 on lever 97 rocks lever 80 rockably mounted on shaft 96, and the upper end of lever 80 closes the main motor circuit, as seen in Fig. 9.

The machine is driven through one cycle of operation on add, subtract, and non-add operations, and through two cycles of operation on total-taking or sub-total-taking operations. A one-cycle operation consists of the rocking of the main drive shaft 95 (see Figs. 2 and 3) first clockwise, as seen in Fig. 3, and then counterclockwise. In two-cycle operations, the shaft 95 rocks twice.

When the motor switch 89 is closed the motor starts and turns motor shaft 94 counter-clockwise. The shaft 94 has secured thereto a notched drive wheel, concealed behind a crank plate 99, loosely mounted on shaft 94. A drive pawl 100 is pivoted on plate 99 by a stud 101, and is urged in an engaging direction toward the notched drive wheel on shaft 94 by a spring 102. The pawl 100 is disengaged from the notched wheel when the machine is in rest position by reason of stud 103 on lever 97, bearing against pawl 100. However, as soon as lever 97 rocks counter-clockwise, as seen in Fig. 3, when the machine latch is tripped, and the motor starts, the pawl 100 is released and engages the notched drive wheel, rotating crank plate 99 counter-clockwise. Main drive shaft 95, journaled in the side plates 91 and 92, has loosely mounted thereon a crank 104, connected to plate 99 through drive link 105. Crank 104 is coupled to the main drive shaft 95 by a yielding driving connection, including lever 106 pivoted to crank 104 and having on its rear end a roller 107 held in a notch in the edge of the plate 108, secured to drive shaft 95, by a strong spring 109. The spring 109 is strong enough to hold the roller in the notch to form a driving connection between the crank 104 and shaft 95 during all normal operations of the machine. The driving connection will yield, however, to any overload placed on the main drive shaft. As plate 99 completes one rotation, an arm 110 thereof strikes a roller 83 on lever 97, rocking it to normal position, which opens the motor switch and relatches the tripping mechanism by stud 82 (Fig. 8) rocking trip latch 85 to effective position. Thus, the mechanism so far described constitutes the single-cycle mechanism of the machine. Under the circumstances of a total or sub-total-taking place, means is provided for causing a second cycle to occur immediately after the first cycle, as these are two-cycle operations. Moreover, in the event the carriage return mechanism is operated, the motor will continue running after the single-cycle mechanism has come to a halt, there being another electric circuit means to the motor to be completed by the closing of switch 81 (Fig. 9).

Figure 2:
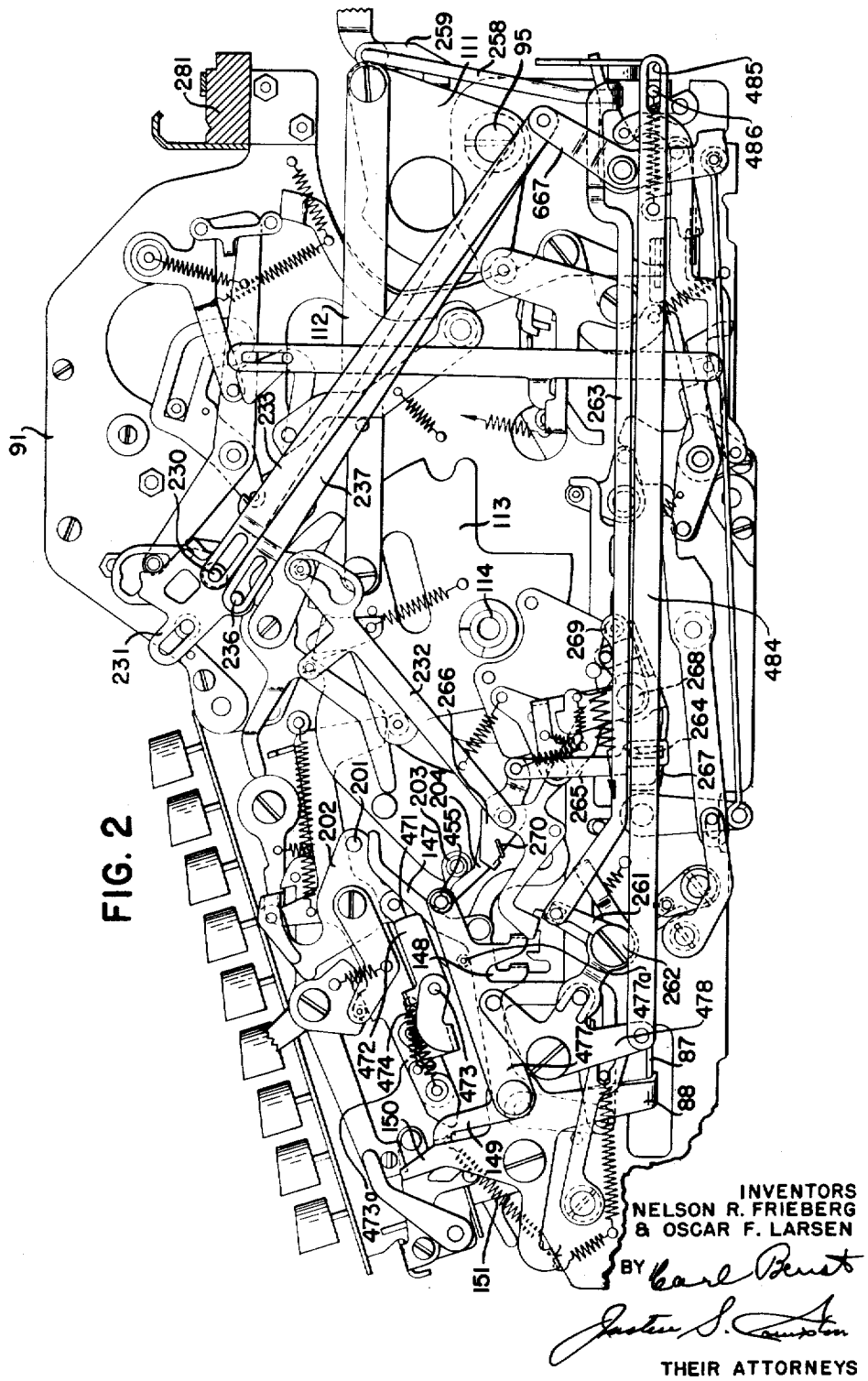
Fig. 2 is a right side elevation of the machine with the casing and carriage removed.

Referring to Fig. 2, the main drive shaft 95 has secured thereto a drive plate 111 connected by link 112 to a cam plate 113 secured to a drive shaft 114, extending between the frame plates. Hence, in one cycle of operation the drive shaft 114 is rocked first counter-clockwise and then clockwise to form one cycle of operation.

*The keyboard and printer*

Figure 4:
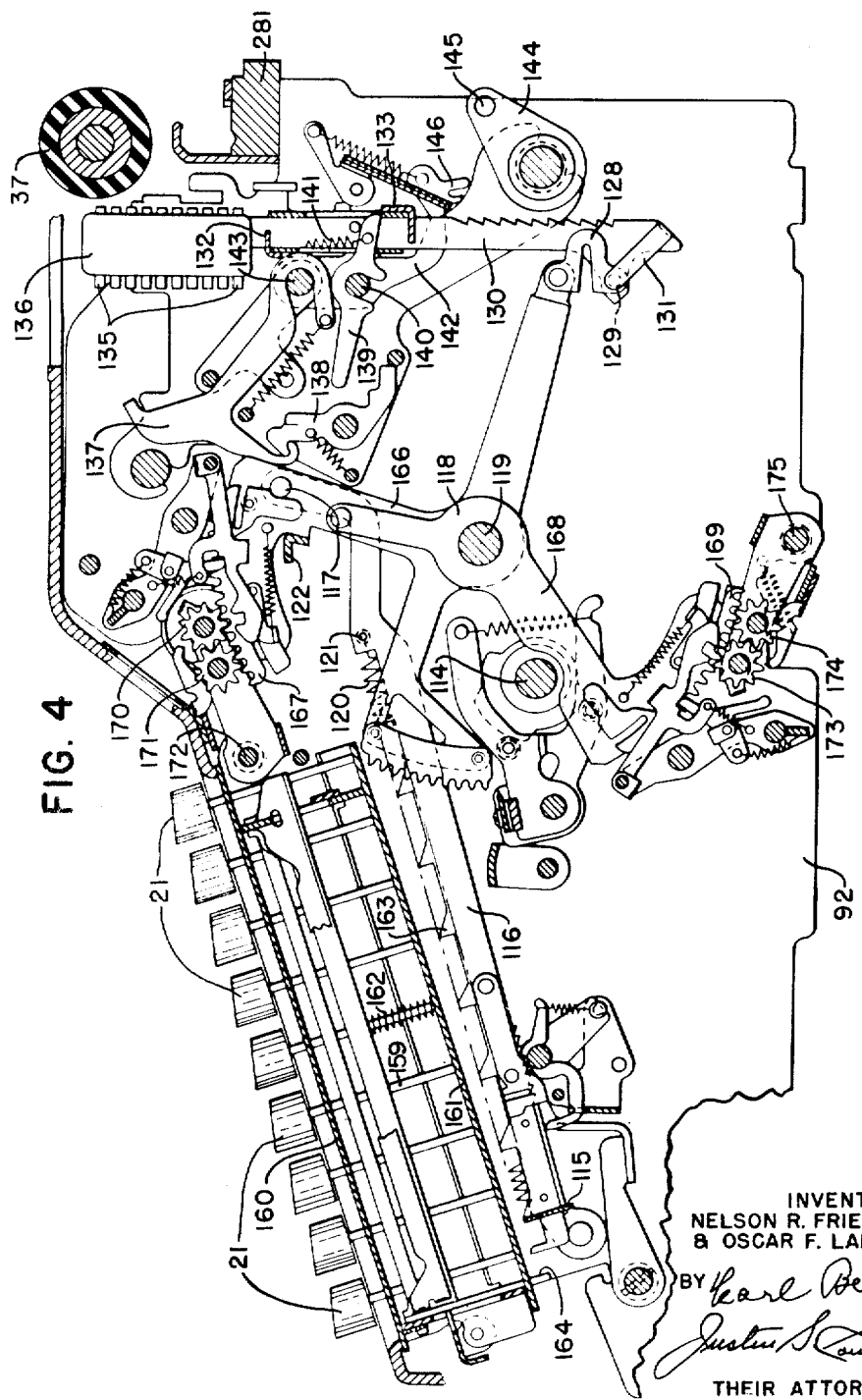
Fig. 4 is a typical vertical section from front to rear, showing a denominational order of the keys, and the stop bar, differential mechanisms, totalizers, and printing mechanisms associated therewith.

Secured between the front end of the right vertical side frame plate 91 (Fig. 2) and the front end of left vertical side frame plate 92 (see Figs. 3 and 4) is a slotted plate or comb 115 (Fig. 4) in which the front ends of a series of denominational order stop bars 116 are guided and supported for sliding movement. There is one stop bar for each denominational order. As the stop bars of all orders are constructed the same, a typical order only is shown in Fig. 4, as an example. Stop bar 116 is pivoted at the rear end by stud 117 to the upper-extending arm of a three-armed diverging lever 118, pivotally mounted on cross-shaft 119 extending between the said side frame plates, and is normally urged forwardly by the spring 120, stretched between a stud 121 on the diverging lever and comb 115. The stop bar normally is held against forward movement by a bail 122, extending across the front of the upwardly-extending arms of all of the diverging levers and is held between two arms pinned to shaft 119. The right arm 123 (Fig. 5) has a downwardly extending portion pivoted to a link 124, having rotatably mounted thereon a roller 125, which is held in engagement with the edge of a cam 126 pinned to drive shaft 95. The rear end of link 124 has a forked end which embraces and rides the shaft 95 for support. As the shaft 95 rocks counter-clockwise, shaft 119 therefore, will do likewise, causing the forward and downward movement of bail 122 by reason of the urge given the diverging levers by the springs, like spring 120 (Fig. 4) urging the stop bars forward. On return movement of the bail 122, on the clockwise movement of the shaft 95 the stop bars will be returned to the rest position (Fig. 4). A rearwardly-extending arm of diverging lever 118 is pivoted to one end of a U-shaped adjusting link 128, the other end of which is pivoted on a stud 129 of a printer bar 130, where it is retained by a spring clip 131. The printer bar 130 is movable vertically in slotted guides 132 and 133, with respect to the paper platen 37, shown diagrammatically in Fig. 4, according to the selected positioning of the diverging lever 118 under control of the associated keys. The platen and associated mechanism will be described in detail with respect to the automatic cross-tabulating carriage, later on. The printer bar 130 has, at the top end, ten vertically-spaced type 135 movable individually in a case 136, toward the paper platen when positioned to print. The type are urged to retracted position by springs within case 136, and the particular type in printing position is hit by the printing hammer 137 when released from the cocked position, at printing time, by the tripping of the latch 138. When the type bar is selectively raised to printing position an interponent 139 rocks counter-clockwise on bail 140 under urge of spring 141.

Bail 140 is secured between arm 142 and another arm, like arm 142, secured on shaft 143. Bail 140 extends across the printer. Cam lever 144 secured on shaft 95 is rocked counter-clockwise and then clockwise during a machine operation, and stud 145 thereon strikes the tail 146 on arm 142, rocking the bail and the rocked interponent 139 toward the lower step of latch 138, which thereby is moved to unlatching position at mid-cycle, but only if the printing bar 130 has been moved from home position so as to render the interponent 139 ineffective, causing the printing hammer 137 to hit the type which is positioned at the printing point.

The described printing mechanism is duplicated in the rest of the denominational orders except that the rearwardly-extending arms of the three-armed diverging levers, like the lever 118, in order to connect the associated printer bars, which are crowded together, as shown in Fig. 1, instead of being in line with the respective key bank denominations, are bent according to the relative lateral position between the stop bar and its associated printing bar.

The digit keys, differential mechanism, and printing mechanism described are old in principle, being disclosed in the afore-mentioned application for United States Letters Patent, Serial No. 349,228, of Nelson Frieberg et al. The rightmost bank of keys 22, as has been said, is used for setting up symbol type, and the printer bar associated with that row of digit keys having symbol type, operates the same as that for the digit keys themselves.

*The digit keyboard*

The digit keys 21, shown in Fig. 4, each has a stem, like stem 159, which is slidably mounted in the alined slots in an upper keyboard plate 160 and a lower keyboard plate 161, and are urged upwardly by individual springs, such as spring 162, only one being shown. Each of the digit keys may be depressed against return action of its spring until the stem thereof extends below the plate 161, where it is in line with one of the stop members 163 on stop bar 116, corresponding to said depressed key. The keys are latched down by flexible latch mechanism whereby if one key in a row is depressed, another then-depressed key will be allowed to resume normal position under action of the associated spring. This flexible latching mechanism is old and well known in the art, and will not be described here, because it has no particular bearing upon the invention, and reference is made to United States Letters Patent to Schroder No. 2,062,731, and to United States Letters Patent to Lambert No. 2,389,062, for more detailed description of the digit key bank construction. If a digit key is operated and the add motor bar 26 or the subtract key 25 is operated, the trip lever 88 (Fig. 2) is rocked, setting the machine into operation, and the diverging lever 118, associated therewith, will swing counter-clockwise until the stop formation 163 will strike the key stem of the digit key, positioning the diverging lever 118 to correctly set the printer bar with the type of the value of the depressed key at printing position.

The depression of a digit key, also through mechanism shown in the Schroder patent, to which reference has been made, operates to move aside the zero stop member 164, which otherwise would block the stop bar 116 after it has traveled the short distance necessary to set up a zero at printing position. On an upward-extending arm 166 of diverging lever 118 is a rack 167 and on a lower-extending arm 168 of the diverging lever 118 is mounted a rack 169. These racks operate, respectively, to enter data into and take data from the upper and lower totalizers.

The totalizers

The upper totalizer consists of a pinion 170 for each of the denominational orders, and a cooperating subtract pinion 171 in mesh therewith mounted on rods in a frame pivotally mounted on cross rod 172. In a similar manner the lower totalizer has a main totalizer pinion 173, a cooperating subtract pinion 174 for each denominational order, and mounted on rods in a frame pivoted on cross shaft 175. Suitable transfer mechanism is provided between the pinions for causing the carry-over of one digit from a lower order to a higher order, and overdraft mechanism is provided to cause an entry into the lower order of a "fugitive" one, whenever a totalizer passes through zero, either going from a positive condition into a negative condition or from a negative condition into a positive condition. All this is fully described in the application for United States Letters Patent, Serial No. 323,462, filed by Nelson R. Frieberg and Oscar F. Larsen, December 1, 1952, which issued into Patent No. 2,760,722 on August 28, 1956. Inasmuch as the totalizer transfer and "fugitive" one mechanism forms no part of the novelty of the invention, a detailed description thereof will not be included in the specification, and reference may be made to the aforementioned patent for a complete disclosure of this mechinism.

Totalizer engaging mechanism

The main totalizer pinions corresponding to pinion 170 in the upper totalizer and pinion 173 in the lower totalizer (Fig. 4) are normally in alinement with their respective racks, the pinions are disengaged from the totalizer. ment therewith. By swinging away from their respective rocks, the pinions are disengaged from the totalizer. The machine is constructed so that in an entry operation, if the previous operation has left the totalizers in add position, the pinions corresponding to pinions 170 and 173 are thrown out of engagement with their respective racks during the first half-cycle of machine operation after which the racks are set to the proper value position and the add or subtract pinions are then re-engaged with the racks during the second-half cycle of the machine operation, during which time the value set up on the racks is entered into the pinions. If the entry operation is a subtract operation, the totalizers are slid to the left before engagement until the subtract pinions are in alinement with the racks corresponding with racks 167 and 169, and the subtract pinions are engaged during the last half cycle of operation, the amounts being entered and turning the totalizer pinions corresponding to pinions 170 and 173 in the reverse direction to enter the amount negatively thereinto.

If the totalizers have been in subtract position they stay in that position if the entry is a subtract entry or move to add position if the entry is an add entry. In sub-total-taking timing, the racks and pinions are left in engagement during both halves of the second of the two cycles of required operation and the sub-total is printed at mid-cycle. In total-taking operations the pinions are left in engagement with the racks during the first half cycle of the second of two machine cycles and disengaged in the last half of such second-cycle of a two-cycle total-taking operation.

Automatic sensing means is provided, to be operated in total-taking or sub-total-taking operations so that if there is a negative amount in the totalizer, the totalizer from which a sub-total or a total is to be taken is moved to the left to engage the subtract pinions, this being done automatically as described in connection with the aforementioned Frieberg and Larsen application.

Referring to Fig. 5, which is an elevation including some of the totalizer control mechanism on the inside of the right frame plate 91, there is shown the right end of the upper totalizer frame support shaft 172 and the right bell crank lever 176, secured thereto, having a lower-extending arm with the roller 177, which rides in a cam slot 178 in a totalizer engaging plate 179, mounted on frame supported stud 180. If plate 179 is rocked clockwise from its home position until the roller is in the lower part of slot 178, the bell crank 176 is rocked counter-clockwise, disengaging the upper totalizer from the associated racks of the differential mechanism. Similarly the bell crank 181 secured on the right end of the lower totalizer frame has a roller 182, riding in a cam slot 183 in the totalizer-engaging plate 184, pivotally mounted on frame-supported stud 185. In adding and subtracting operations, as has been said, both totalizers are engaged with their respective racks in every entry operation. On the main drive shaft 95 is an arm 186 having pivoted at its outer end a hook lever 187, which engages a stud 188 on a multiple-armed lever 189 pivoted on frame-supported stud 190. On each machine operation, unless otherwise controlled, the arm 186 through hook lever 187 rocks multiple-armed lever 189 first counterclockwise and then clockwise on each machine operation. Pivoted to an upwardly-extending arm of the multiple-armed lever 189 is a pitman 193, which cooperates with studs on a lever 194 mounted on stud 180, in adding and subtracting operations. The pitman 193 is coupled through lever 194 to plate 179 so as to give it in the first half of a machine cycle in which entries are made, a clockwise movement which disengages the upper totalizer. Near mid-cycle the plate 179 is rocked back to normal position by pitman 193 which re-engages the upper totalizer so that amounts may be entered into it. The lateral position of the totalizer determines whether such entries are to be made additively or subtractively. In a similar manner a pitman 195, pivoted to another arm of lever 189, cooperates with a lever 196 pivotally mounted on stud 185 for actuating the plate 184 in item-entering timing. In taking sub-totals, totals, and in non-add operations, the control of the engaging mechanism for the totalizers is changed. In non-add operations the totalizers are disengaged at the beginning of a machine cycle and not engaged until the end thereof. The engagement during sub-total and total-taking operations has been explained as regards the timing, but in such operations one of the totalizers must be disabled so it is out of engagement during the total-taking operation or sub-total-taking operation of the other totalizer.

In the construction of this machine it has been arranged to operate some of the manually-operated control key mechanisms by the stops on the carriage.

Reference is made again to the Frieberg and Larsen applications, mentioned above, for more details of the totalizer-engaging mechanism, as a complete explanation is not necessary to an understanding of this invention.

The subtract mechanism

Referring to Figs. 2, 3 and 6, the Subtract key 25 has a stem 197 mounted by stud and slot connection to a bracket 198, secured to the inside of the casing, and is normally held in an up position by a spring 199, but it may be depressed against the urge of said spring. The Subtract key stem has an extension 200 which, when the Subtract key is depressed, bears down on a stud 201 on on subtract plate 202 (Fig. 2) pivoted to the right side frame plate 91. On a downwardly and rearwardly-extending arm of plate 202 there is mounted a roller 203.

As the Subtract key is pressed down, plate 202 rocks clockwise, as seen in Fig. 2, and the roller 203 bears down on an arm 204 secured to subtract cross-shaft 205, the left end of which is seen in Fig. 3, rocking the shaft clockwise, as seen in Fig. 3. Stud 201, at the same time, bears down on a rearwardly-extending arm 147 of lever 148 pivoted to trip lever 88 and secured thereto by an arm 149 held against arm 150 by spring 151, rocking trip lever 88 to set the machine in operation. As seen in Fig. 3, the subtract cross-shaft 205 rocking clockwise, carries with it a lever 206 secured thereto, which is connected by top and bottom links 207 and 208 to a lever 209, pivoted to the left side frame plate 92. Pivoted to left side frame plate 92 is a totalizer shift cam 210 cooperating with the totalizer support shaft 172 for the upper totalizer, and a totalizer shift cam 211 having a cam portion which cooperates with the lower totalizer support shaft 175. A roller stud extending radially from shaft 172 rides in a cam slot on the periphery of cam 210, and in a similar manner a stud on shaft 175 rides in a peripheral cam slot in cam 211. In the position shown in Fig. 2 the cam 210 is moved to its most clockwise position in which the upper totalizer is in the add position and the cam 211 is likewise positioned in its most clockwise position, in which the lower totalizer also is in the add position. To shift these cams to the counter-clockwise position, in which their respective totalizers are moved to the subtract position with respect to the differential racks, the cam 210 is provided with a pitman 212 pivoted thereto, and the cam 211 is provided with a pitman 213 pivoted thereto. On the left end of the drive shaft 114 is mounted a plate 214 having a stud 215 cooperating with pitman 212, and a stud 216 cooperating with pitman 213. In the position of the pitmans shown, the studs 215 and 216, as the machine cycles and rocks plate 214, have no effect on the pitmans 212 and 213, but if the lever 206 is rocked clockwise by shaft 205 through the operation of the subtract key or the subtract stop, the pitman 212 is swung counter-clockwise by means of pin 217 on link 207, which pin rides in a slot in pitman 212, and pitman 213 is rocked counter-clockwise, by a similar pin 218 in link 208, which rides in a slot in pitman 213. At the beginning of a machine operation pitman 212 is drawn down by stud 215 and pitman 213 is drawn up by stud 216. The cam 210 is rocked counter-clockwise and cam 211 is rocked counter-clockwise through plate 152 and link 153. This moves the totalizers to the left, or subtract, position and on the ensuing machine operation items set up on the digit keys are entered subtractively into both totalizers.

This subtract control mechanism, including shaft 205 and pitmans 212 and 213, is returned to the add position whenever the subtract key is released, or as will be explained later, whenever a subtract stop on the carriage is moved by movement of the carriage from effective to ineffective position, this restoration of the subtract means being accomplished by a spring 154. Therefore, on the next operation of the machine, after a subtract operation, provided no subtract key or control is effective, the cams 210 and 211 will be turned to the add position at the beginning of the machine operations.

Non-add operations

Referring to Fig. 3, the non-add key 30 is slidably mounted for substantially vertical movement in alined slots in a bracket 219 secured to the left side plate 155 of the keybank unit. The lower end of the key stem of key 30 has a laterally-extending arm 156 which bears on a stud on the upwardly-extending portion of a slide 221, mounted for up and down movement by a stud and slot mounting on left frame plate 92. Depression of non-add key 30 pushes the slide 221 down, rocking lever 157 pivoted to plate 92 at 222 clockwise. The lower end of slide 221 bears down on a bent-over ear of a yoke 223 mounted on shaft 224 (see Fig. 5). On the right end of yoke 223 is secured an arm 225 which embraces the rear edge of the stud 226 on the non-add link 227. The non-add link 227 is ordinarily kept in a rearward position by a spring 228 and this in turn keeps the slide 221 (Fig. 3) in its upper position unless pressed downwardly by key 30. The forward movement of link 227 conditions the totalizer-engaging mechanism for a non-add operation, as more fully described in the application for United States Letters Patent, Serial No. 323,462, of Frieberg and Larsen, before mentioned.

Total and sub-total taking under key control

Depression of the total key 23 (Fig. 6) against the return action of spring 228 causes an arm 229 on the key stem to bear down on stud 230 (Fig. 2) on total key slide mounted for sliding movement behind sub-total slide 231, by slot and stud coupling on the right vertical frame plate 91, causing the total slide to move downwardly and rearwardly to set the machine into a two-cycle operation through the downward and forward movement of link 232 in the manner described in said Frieberg and Larsen applications, mentioned above. In automatic total-taking operations the link 233 is drawn downwardly and rearwardly by a solenoid, as will be described, which acts on stud 230 as though the total key has been operated, instituting a total-taking cycle.

In taking a sub-total the key 24 (Fig. 6) mounted in the same way on bracket 198, as is key 23, and having a return spring 234 to hold it in the undepressed position, when depressed, forces arm 235 on its key stem against stud 236 (Fig. 2) on sub-total slide 231, taking total slide 231 with it as stud 230 passes through plate 231, which movement of both slides makes the two-cycle operation a sub-total-taking operation, as described in the afore-said Frieberg and Larsen application. This sub-total movement of stud 236 may be caused automatically by solenoid operation, which draws link 237 downwardly and rearwardly to operate said total and sub-total slides.

No further description of the total and sub-total operations need be made as this invention is only concerned with the initiating mechanism therefor.

The reverse key

The "Reverse" key 28, also slidably mounted in bracket 219 (Fig. 3) has a slanting edge 256 which, when the key is lowered against the return action of spring 257, will bear against stud 260 of lever 206, preventing that lever from being moved to subtract position by movement of shaft 205, even though a subtract operation has been called for by a carriage stop. A subtract operation is controlled by the carriage by its causing rod 258 (Fig. 2) to be swung in a clockwise manner in its supporting bracket 259, which causes forward movement of link 263, pivoted at its forward end to an arm 261 pivoted on stud 262. Link 263 has a stud 264, which rides in a slot in lever 265 pivoted to an arm 266 pivoted to the right end of cross shaft 205 (see Fig. 3). As link 263 (Fig. 2) moves forwardly, a shoulder on lever 265 rides over an upper-extending arm of lever 267, pivoted on pivot 268 and rocked through roller 269 whenever the cam plate 113 operates on a machine operation. This will lift the lever 265 and through a resilient spring connection by spring 270 with arm 204, secured to shaft 205, will rock it in subtracting direction, setting up the pitmans 212 and 213 (Fig. 3) for a subtract movement of the totalizer. However, if the "Reverse" key 28 is depressed, this subtract movement is prevented and the spring coupling between arm 266 and arm 204 (Fig. 2) permits this. This construction of the subtract-reverse key mechanism is more fully disclosed in the application for United States Letters Patent, Serial No. 349,228, of Nelson R. Frieberg and Oscar F. Larsen, filed April 16, 1953, to which reference is made for more details of the construction, inasmuch as what has been described will give a full understanding of the invention disclosed in this application.

The carriage framework

Referring to Figs. 10, 11 and 14, the carriage is supported on a rail 281, secured to the upper rear edges of vertical side frame plates 91 and 92. The left side carriage frame plate 282 and the right side frame plate 283 (Figs. 14 and 11) are joined, and braced by a rail 284 (see especially Fig. 10) which has on the rear edge thereof rack teeth by which the carriage may be returned to the right of the machine after tabulating to the left during a series of entry operations. Also extending between and forming a support for the side plates 282 and 283 is a rod 285. Referring to Figs. 11 and 14, rails 281 and 284 have ball races between which ball bearings are held so that the carriage may move frictionless on rail 284. The cross rod 285 is supported by an upper and lower roller, which are pivotally mounted on a bracket extending from rail 281, in the center of the machine, it not being visible in Fig. 10, but of old and well-known construction. This provides for an easy lateral movement of the carriage with respect to the machine. Referring to Fig. 10, there is secured to the carriage, by latch pieces 286 and 287, a stop bar 288, having pairs of grooves over which stops of the type shown in Figs. 24 and 32 may be clipped by forcing the arms of the stop into an associated pair of slots on the stop bar. These stops will be described in detail later, as to function.

The carriage tabulating mechanism

The carriage is urged to the left in the conventional way by a spring reel 295 (Figs. 10 and 14) mounted on a bracket on the support rail 281 and having wound around it a cord 296 attached to the right end of the carriage which, as the reel is on the left end of the carriage, tends constantly to pull the carriage toward the left. Extending over stop bar 288 is a tabulating stop bar 297 (see Figs. 10, 17 and 24) mounted on a horizontal pin 298, so the rear end may move up and down with relation to the stop bar, and is urged toward it, by a spring 299 (Fig. 17) but may be moved away from it in response to the urge of tabulating mechanism to be described. Pin 298 is supported in a bracket extending downwardly from the carriage support rail 281. The rear end of the tabulating stop bar is kept from actually striking the stop bar 288 by roller 305 on bracket 304 attached to bar 297 and resting on bail 307, to be described, so that the carriage may move unrestricted unless prevented by one of the stops. The front end of the tabulating stop bar has a beveled surface 301, which allows free return of the carriage to the right over any stop except a terminal stop. The stop surface 302 is struck by the upper arm 303 of any of the intervening stops (see Fig. 32), to bring the carriage to a halt. If the rear end of the stop is lifted, the carriage will proceed to the left under the urge of the spring reel 295 until it comes to a terminal stop having a wide upper arm, like arm 304 (Fig. 32), which is higher than the tabulating stop bar. The tabulating stop bar will be raised by the mechanism next to be described. Roller 305 extends over the tabulating release bail 307 pivotally mounted by right and left arms on side plates 282 (Fig. 14) and 283 (Fig. 11). Referring to Fig. 11, the right end of bail 307 extends through the right side of carriage side frame plate 283 and over an arm 308 of carriage release lever 50, which may be rocked counter-clockwise, as seen in Fig. 11, to raise the bail and withdraw the tabulating stop surface 302 from in front of whatever stop it may be positioned, allowing the carriage to move under control of the spring reel. A bell crank lever 310 (Fig. 17), pivoted on the machine proper, has a rearwardly-extending arm projecting under an ear 306 of bracket 304 and a downwardly-extending arm having a rearwardly and upwardly projecting portion 311. On the rear drive shaft 95 is a cam arm 312, having a stud on its upper end, not seen in Fig. 17 because of mechanism in front of it, which strikes a by-pass pawl 313 pivoted on a stud on a bracket 314 secured to the back cross-brace of the machine. As the machine cycles, in the first half cycle, the stud on cam 312 by-passes pawl 313, the latter rocking counter-clockwise around its pivot stud, as seen in Fig. 17, and on the return stroke the pawl is rocked clockwise and a stud 315 thereon strikes the rear end of a lever 316, having a stud 317 which rides in a slot 318 in bracket 314, pushing said lever rearwardly and forcing a stud 319 thereon to push rearwardly on the upwardly-extending portion 311 of lever 310 and rocking it clockwise, which will operate on ear 306 to raise the rear end of the tabulating stop bar 297 to free the carriage for movement by the spring reel, to the next stop, the aforesaid parts immediately moving back to normal effective position as soon as the stud on cam 312 has passed on by the by-pass pawl 313, near the end of a cycle of machine operation. As will be described in connection with the vertical feed mechanism, a link 320 is pulled to the left, as seen in Fig. 17, on operation of the vertical feed bar 27 (see Figs. 1 and 16 also). Link 320 has a slot and stud connection with vertical feed blocking lever 321 pivoted to the machine frame and having a stud 322 which loosely passes through a hole in bracket 323, attached to a link 324. The upper end of link 324 is pivoted by stud 319 to link 316, so that when the vertical motor bar is operated the rearward end of link 316 is pulled downwardly, rocking the forward end of said link out of the path of pawl 313, so that there will be no tabulation.

Carriage return mechanism

Referring to Fig. 25, if the carriage has tabulated against a "Return" stop, like stop 330, which has a carriage return tappet 331 thereon (see Fig. 32 also), mechanism is set up whereby at the close of the subsequent machine operation the motor will be engaged with the carriage return rack by a mechanical coupling, and a switch will be closed to operate the motor, which will return the carriage to a right position, as determined by another stop, to be described. Incidentally, though the mechanism will not be discussed at this point, the stop 330 has an upwardly-extending tooth 332, which operates a switch which energizes the automatic total-taking solenoid. The tooth 332 strikes the top end of lever 333 (see also Fig. 10) pivoted on a bracket secured to rod 285, rocking said lever clockwise as seen in Fig. 25, around its pivot 334. As seen in Fig. 25, the lower end of lever 333 has a pin and slot coupling with a yoke 335 pivoted on a shaft 338 running rearwardly from the framework of the machine. The lower-extending arm of yoke 335 is forked to receive pin 336 of a yoke 337 also pivoted on shaft 329, rocking said yoke 337 counter-clockwise on shaft 329, as seen in Fig. 25. Yoke 337 has on its lower-extending arm an upwardly-extending pin 339 engaging the lower forked end of a cam lever 340, pivoted at 341 to the machine frame. The upwardly-extending portion of cam lever 340 has a bent-over camming portion 342, which extends over the top of a member 343, which has an upwardly opening slot 344 and a bent-over end 345. The straight, rearwardly-projecting end 346 extends through a slot in a supporting plate, not shown in Fig. 25 or in Fig. 29 which is a reverse view of part of the mechanism of Fig. 25, because it would interfere with the showing of the mechanism. As seen in Fig. 29, the bent-over end of member 343 is held upwardly by a spring 347 so that its slot 344 engages a stud 348 on the upper end of a lever 349 pivoted at 350 to a frame-supported bracket. The lower end of lever 349 has a ball and socket coupling with bell crank lever 351 pivoted to a cross-brace 352. Lever 351 has a tappet formation 353, which, when member 343 is pulled forward, is thereby moved to the position shown in Fig. 29, closing the normally open switch 81 to which reference has been made before. Switch 81 is a switch that is open when tappet 353 is pressed against its toggle mechanism in its normal unoperated condition. The formation 345 on member 343 is picked up by a cam formation on lever 354 (Fig. 25) on the main drive shaft 95, as a cycle of operation following the movement of lever 333 comes to a close, moving the mechanism, just described, to close the switch 81. Referring back to Fig. 29, lever 349 has a pin 355, which rides in the forked end of a yoke 356 on shaft 95, which has pins 357 and 358 thereon, which engage a groove 359 (see Figs. 25 and 21), in clutch member 360, slidably mounted on shaft 361.

Referring to Fig. 21, which is an exploded view of the motor drive mechanism for carriage return operations, shaft 362 extending from and driven by the motor, not shown, has pinned thereto a beveled gear 363 which is in mesh with a companion gear 364 pinned to shaft 365. Shaft 361 supported in the end of shart 365 has a disc 361a secured thereto which is driven by a first shock absorbing spring 366 secured in disc 365a. The rear end of shaft 361 is supported in the hub of a clutch member 368 having radial corrugations 367 and is engaged on rearward movement of clutch member 360 slidable by pin and slot coupling on shaft 361 through the rocking of yoke 356. The rear surface of clutch member 360 has corrugations 366a which engage corrugations 367 driving clutch member 368 and shaft 369 to which it is secured. A beveled gear 370 is mounted on the rear of shaft 369 and has a limited movement rotationally thereon by means of a pin and slot coupling 371a and a second shock-absorbing spring 371b connecting shaft 369 and gear 370. Gear 370 engages a companion gear 371 on shaft 372 coupled by a bayonet coupling 373 to a shaft 374 having a spur gear 375 which is in mesh with a gear 376 coupled by a shaft to gear 378. Gear 378 is in mesh with the carriage return rack 284, before mentioned. Ordinarily the parts 367 to 378 inclusive, move freely with the rack when the carriage tabulates, but as the clutch members 360 and 368 engage, they are coupled to the motor which, when started by the closing of switch 81 (Fig. 29), causes the carriage to return to the right until stopped by mechanism which will be described.

As the carriage returns, under control of the carriage return mechanism, there has been provided means to raise the tabulating stop bar so that the stops will not strike the beveled surface 301 (Fig. 17) of the tabulating stop bar, raising it each time a stop strikes it, to prevent a clicking noise as the carriage returns. On a ribbon feed link 379, pivoted to arm 380 secured on drive shaft 95 is welded a bracket 381 having rearwardly-extending ears on which a yoke 382 is pivotally mounted, said yoke having rearwardly-extending legs 383 and 384, the leg 384 having a shoulder 385 to cooperate with an ear 386 extending leftwardly from the downwardly-extending leg of bell crank 310. The yoke is biased by a spring 388 to turn the yoke so that the legs tend to move downwardly. Normally such movement is prevented by the upwardly-extending bent-over arm 389 of yoke 337 (see Figs. 25 and 15), so that the shoulder 385 is not in the path of ear 386, as bell crank 310 is moved on operation of the machine. However, when yoke 337 rocks on stop-controlled carriage return operations, the bent-over end 389 of yoke 337 lowers and, as the machine operation commences by clockwise movement of drive shaft 95, as seen in Fig. 17, the ribbon feed link rises, and the leg 384 is lowered and drawn backward so as to catch ear 386 of bell crank 310 as it is rocked for tabulating movement. As the machine cycling action proper comes to a halt, the tabulating stop bar 297 will be held in ineffective position so the carriage is returned without any clicking action of the tabulating bar surface 301 over the stops. At the end of the return movement, of course, the yoke 337 returns to upright position and bell crank 310 will be unlatched and returned to home position.

Referring to Figs. 25 and 15, the shaft 329 has thereon, in back of yoke 337, a lever 387 (Fig. 15), which has a normal position as shown by the dotted line, where it has no effect on leg 384 of yoke 382. On vertical feed operations, where link 320 is drawn to the left, as seen in Figs. 15 and 17, the lever 387 is rocked clockwise by stud 390 to the position shown in full line in Fig. 15, where it is effective to hold the yoke 382 from latching the bell crank 310 so that if the vertical motor bar is held down in an operation where the carriage is returned to the next stop it will be held there by the tabulating stop bar.

*Automatic vertical feed*

Figure 16:
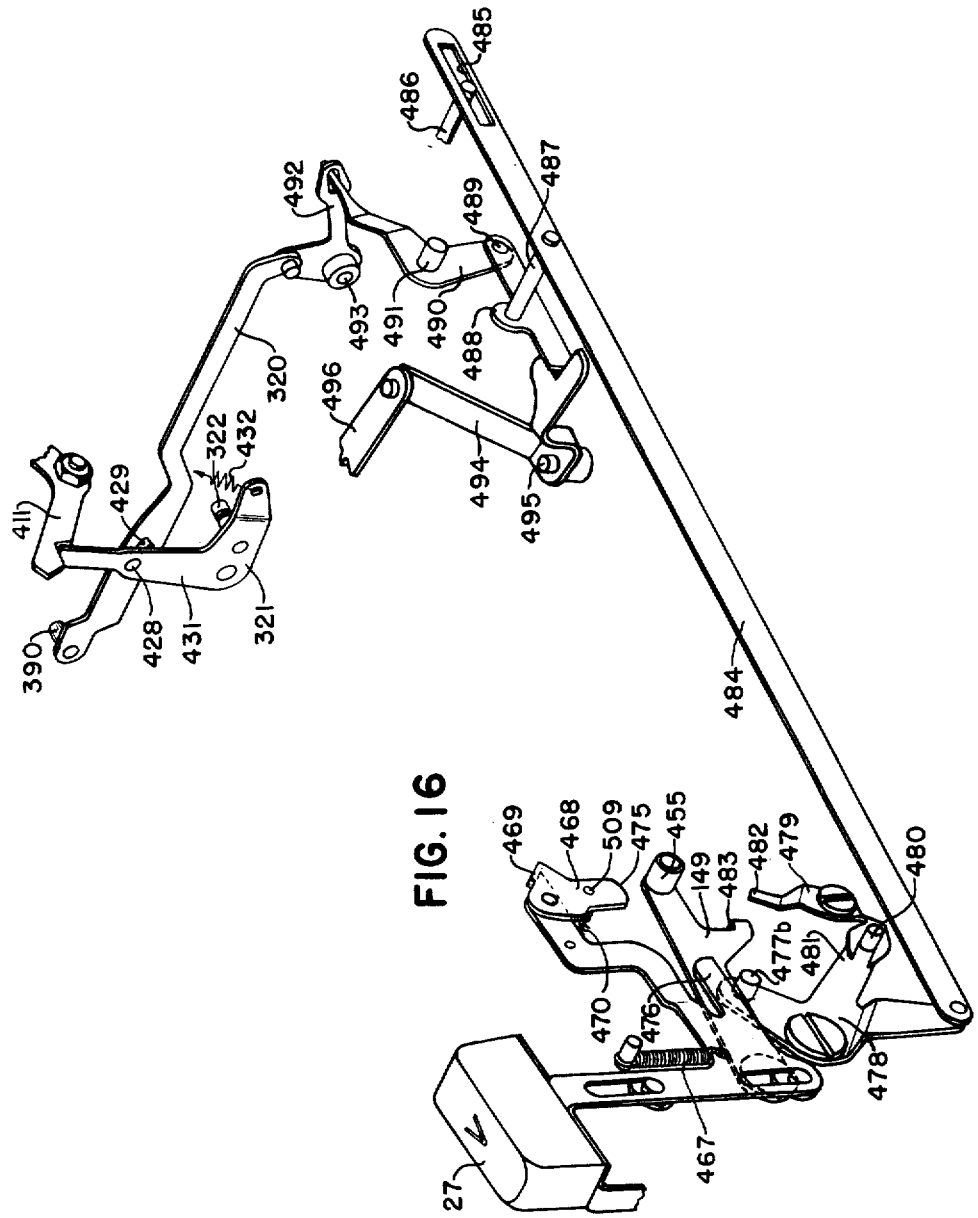
Fig. 16 shows the vertical feed motor bar and associated linkage for enabling the vertical feed from machine operation.

Pivoted to the left carriage frame plate 282 (Fig. 14) by a pivot 400 is an arm 401 supporting the left end of a vertical feed bail 402 (see also Fig. 10). The right end of feed bail 402 is supported by arm 403 (Fig. 11) pivoted by a pivot 404 to right carriage side plate 283. The bail is biased to swing clockwise around its pivots, as seen in Fig. 11, by reason of a spring 405 wound around pivot 404 and hooking over the lower end of arm 403, and by a similar spring 406 on the left side, as seen in Fig. 14. Pinned to a frame-supported member 399 is a yoke composed of members 407, 408 and 409 (Fig. 31), the member 408 having an ear embracing the top and outside edges of member 407 and supporting a roller 410 mounted on a vertical stud. The member 407 has a forwardly and upwardly-extending portion 411. The surface 412 of the yoke member 407 rests against a stud on arm 430 on rear drive shaft 95. When the machine is at rest the roller 410, which constantly bears on the forward edge of the feed bail 402 keeps the feed bail rocked to its counterclockwise position, as shown in Fig. 11. As the machine operates, the shaft 95 moves the arm 430 and its stud away from surface 412, and the bail rocks clockwise, as seen in Fig. 11, unless otherwise prevented. Referring to Fig. 31, the upper end of arm 403 has pivoted thereto at 414, a pawl 415 held rocked by a spring 417 so its upper edge is held against stud 416. The toothed end of feed pawl 415, when the machine is in rest position nearly engages a ratchet wheel 418 on the end of the paper platen support shaft 419 (see Fig. 11). As the machine commences operation and the feed bail 402 moves toward the rear casing of the machine, the pawl 415 is drawn rearwardly and on the last half of the machine cycle the pawl moves forwardly, making contact with a tooth on the ratchet wheel 418 and moving the ratchet wheel and the platen coupled thereto in a vertical feeding direction. Pivoted on platen support shaft 419 (Fig. 12), to which ratchet wheel 418 is secured, is the vertical feed space control lever 54, having a downwardly-extending portion provided with a slot arcuate to the pivot point, the upper edge of the slot being notched to cooperate with a stud in a bell crank lever 391 pivoted to the platen's right support plate 392. The lower edge of lever 54 (Fig. 12) has a camming surface 421. The lever may be moved to a clockwise position to hold the feed pawl 415 entirely away from the ratchet wheel 418, and it may be moved from there in a counter-clockwise direction to a "1" position in which the cam surface 421 will hold the feed pawl 415 only partly away so that the platen will be given one vertical spacing movement. In the full counter-clockwise, or "2," position of lever 54, the camming surface 421 is ineffective on pawl 415, and its movement on a machine operation spaces the ratchet wheel to give two vertical spacing movements. This vertical spacing movement, caused by the machine operation, is blocked in the event that lever 34 (Fig. 1) is in the forward position, in which event, the three-armed lever 422 (Fig. 23) is in its most counter-clockwise position, which lowers the links 423 and 424, to the position shown in Fig. 23. In this position the guide stud 426 is in the upper end of slot 427. Normally there is positioned in front of portion 411 of member 407 (Fig. 31) an upwardly-extending arm 431 of a bell crank lever 321 pivoted to a cross member in the machine, and held in the position shown by a spring 432 (see also Fig. 16) blocking the feeding movement of the vertical feed bail 402. The arm 431 of bell crank lever 321 has a stud 428 riding in a slot 429 of link 320, keeping the spring 432 from rocking the bell crank too far counter-clockwise, as seen in Fig. 16.

If lever 34 is now placed in its middle position (Figs. 1 and 23), which is the "space-up" and "tabulating" position, the three-armed lever 422 will be caused to rock slightly clockwise, drawing up on link 424, which leaves stud 426 midway in the slot 427, and which will rock cam plate 433 counter-clockwise slightly, as seen in Fig. 23. Cam plate 433 has a slot 435 in which rides a pin 436 in the left end of a lever 438. As seen from the rear cam 433 is urged clockwise by a spring 437 (Fig. 19) to hold it in contact with link 424. This lever 438 is pivoted near its center by a pivot to a rear cross member of the machine, and said lever has at its right end a stud 440, which rides in an arcuate cam slot 441 in a camming lever 442, pivoted at 443 on the lower extending arm of yoke 337. The right end of lever 442 bears on stud 322 of bell crank lever 321.

When lever 34 is in the forward or "no space-tabulating" position, as shown in Fig. 23, that is to say, set for a machine operation in which the platen does not feed vertically but does tabulate, pin 436 rests in the rightmost part of cam slot 435, as seen in Fig. 23, and the pin 440 (Fig. 19) on the other end of lever 442 holds lever 442 so that upon the rocking of yoke 337 as the return tappet 331 (Fig. 25) strikes lever 333, the end 446 of lever 442 (Fig. 19) will not bear down on stud 322 to rock the vertical space bell crank 321 to unblocking position and, therefore, the platen is not spaced vertically on the machine operation at the close of which the carriage is returned to the left as has been described.

If, however, the lever 34 (Fig. 23) is in the middle position, lever 438 is rocked clockwise slightly by cam 433 so that as yoke 337 (Fig. 19) rocks as tappet 331 strikes lever 333, the right end 446 of lever 442 rocks down rocking the vertical space bell crank 321 to ineffective position so that on the machine operation at the end of which the carriage returns the platen will vertically space.

If the lever 34 is in the rear position, as seen in Fig. 1, the bell crank 422 (Fig. 23) is in its most clockwise position, stud 426 is in the bottom of slot 427, and the lower end of link 424 engages and lifts the left end 447 of a lever 448 (see Fig. 19) pivoted to pivot 439 causing the right end 449 of said lever 448 to bear down on stud 322 rocking the vertical feed bell crank 321 to ineffective position so the platen will vertically space on each machine operation. In addition, if a tappet 331 like that on stop 330 (Fig. 25) attempts to rock yoke 337 (see Fig. 19) a stud 450 thereon striking a surface 451 on a block 452 secured to lever 448 prevents such rocking and thus prevents the return of the carriage.

To allow listing of entries, that is to say, vertical listing without automatic sub-total taking or total-taking in those columns where such function usually takes place, a normally closed micro-switch 460 (Figs. 23, 27 and 28) in the solenoid supply circuit is opened by the action of the lower end of link 424 rising and rocking a lever 462, pivoted on frame-supported stud 463, clockwise as seen in Fig. 23, the forward end acting on lever 464 pivoted on frame-supported stud 465 to actuate switch button 466 to open the solenoid supply circuit.

*Manually-controlled vertical feed*

Referring to Fig. 16, the vertical feed motor bar 27 (see also Fig. 6) mounted in bracket 198 may be depressed against the return action of a spring 467. The rearwardly-extending arm thereof has a by-pass pawl 468 pivoted thereto and extending downwardly therefrom. The by-pass pawl cannot rock counter-clockwise as shown in Fig. 6 because of an ear 469. When the casing, on which the keys of Fig. 6 are supported, is in place on the machine the by-pass pawl 468 is in the position shown when the machine is in rest position as spring 470 tends to rock it counter-clockwise as seen in Fig. 6. A pawl 472 (Fig. 2) pivoted at 473 to key release lever 473a is held by spring 474 in the shown position with an ear resting on lever 473a, against counter-clockwise movement, but is free to rock clockwise. The lower edge 475 (Fig. 6) of pawl 468 rests on top of roller 455 (Fig. 2) which, when pushed down, rocks its supporting arm 477 clockwise around its pivot on trip lever 88 tripping the machine by stud 477a bearing down on lever 149, as has been described. Therefore, if the vertical feed key 27 is given a temporary depression and is released before the end of a machine cycle, the machine goes through a one-cycle entry operation with vertical feed caused by operation of the vertical feed bail 402 by means of the following described mechanism. Referring to Fig. 16, as key 27 is depressed, a short rearwardly-extending arm 476 strikes stud 477b on one arm of three-armed lever 478 pivoted to the right side frame plate 91 rocking it clockwise before edge 475 of by-pass pawl 468 strikes stud 455 to rock lever 149 and set the machine in operation. A latch piece in the form of a bell crank lever 479 pivoted to frame plate 91 has a forked arm in which rides a stud 480 on a middle arm 481 of lever 478, and has an upwardly-extending arm 482 which is rocked counter-clockwise as lever 478 rocks clockwise, catching arm 482 back of an ear 483 on lever 149 as the latter is rocked by pawl 468. Thus, lever 478 is held rocked clockwise until the close of a machine operation when trip lever 88 (see Fig. 2) is restored. As lever 478 rocks clockwise link 484 is drawn forwardly. The rear end of link 484 has a slot 485 by which it is supported on a frame-supported stud 486. A stud 487 extends leftwardly from link 484 and is secured in a link 488 pivoted to bell crank lever 490 pivoted on frame-supported pivot 491. A rearwardly-extending arm of lever 490 extends into a slot in a bell crank lever 492 pivoted on frame-supported stud 493. An upwardly-extending arm of lever 492 is pivoted to link 320 coupled to vertical feed bell crank lever 321 by pin and slot coupling. Through the described linkage, as key 27 is depressed, the bell crank lever 321 will be rocked to ineffective position so the feed bail 402 will operate to vertically feed the platen on the ensuing machine operation. The parts will be restored to normal at the end of the machine cycle unless the vertical feed key is held down through the close of the said ensuing machine cycle.

As links 484 and 488 move forwardly the forward end of link 488 rocks a bell crank lever 494, pivoted on a vertical frame-supported stud 495, clockwise pulling to the right a link 496 pivoted to the rearwardly-extending arm of bell crank lever 494. The left end of link 496 (Fig. 26) is pivoted to a lever 497 which is in turn pivoted to a lever 498. Levers 497 and 498 are resiliently coupled together by spring 499. The rear end of lever 498 is pivoted to a link 500 pivoted to the downwardly-extending arm of yoke 337 pulling yoke 337 in a carriage return movement. If the vertical feed key 27 is released before engagement of the carriage return clutch the vertical feed alone takes place. If the vertical feed key 27 is held down until the carriage return clutch is engaged, the carriage will be returned one column as will be described next.

*Vertical spacing and return of carriage by holding down vertical space key*

As has been described with reference to Fig. 15, as link 320 is pulled in the direction of the arrow by operation of the vertical feed key, lever 387 is rocked clockwise, as seen in Fig. 15, to move it from the dotted line position to the solid line position. Lever 387 is secured to shaft 329, which in turn, is coupled by coupling 501 to shaft 338 which is thus turned clockwise. Secured to the rear end of shaft 338 is a cam member 502 (see also Fig. 10) which rocks an interponent 503 to the position shown in Fig. 15 where a stud 504 thereon is in the path of the hooked lower end of a lever 505 pivoted on pivot stud 334. Ordinarily the lever 505 is held in a home position by a spring 506 and is free to move resiliently on its pivot in either direction when hit by a tappet 507 placed on the lower arm of a carriage stop 508 (see also Fig. 32). This tappet controls the return of the carriage to a predetermined point when the vertical feed key 27 is operated. In the set-up of stops on the stop bar 288, to bring about the program of posting operations described as preferred, the stop 508 stops the carriage in the date and folio columnar position. When the vertical feed key 27 (Fig. 16) is depressed and held down through the end of an operation, the machine trip lever is permitted to move to untripped position at the conclusion of the machine operation because as pawl 468 (Fig. 16) descends and strikes roller 455 the stud 509 strikes against surface 471 (Fig. 2) of pawl 472 rocking pawl 468 (Fig. 16) off of roller 455 (Fig. 2) so that the trip lever 88 can move to home position unimpeded. Returning to Fig. 15, interponent 503 is pivoted to an upwardly and rearwardly extending arm 510 of a yoke 511 rockably mounted on shaft 338. An ear 512 on arm 510 extends up and behind the rearwardly and upwardly extending arm of yoke 335. When, near the end of the machine cycle in which the vertical feed key is being held down, cam 354 (Fig. 25) operates member 346, yoke 356, and switch 81 (see also Fig. 29), the carriage commences its return movement. As stop 508 (Fig. 15) approaches lever 505, tappet 507 strikes the top end of it rocking it counter-clockwise. As stud 504 now is in the path of the lower end of lever 505, yoke 335 is returned to home position, carrying yoke 337 to home position, which disengages the carriage return clutch. At the time yoke 337 moves to home position a link 453 (Figs. 19 and 29) is pulled to the right as seen in Fig. 29, rocking bell crank 351 to home position which opens motor switch 81. The resilient coupling between levers 497 and 498 (Fig. 26) permits the just-described return of yoke 337 to home position even though the operator has not yet released the vertical feed key 27.

*The front feed paper-holding mechanism*

Referring to Figs. 11 and 14, the platen shaft 419 is journaled in a right platen support plate 392 (Fig. 11), before mentioned, and a left platen support plate 520 (Fig. 14). Plates 392 and 520 are pinned to cross shaft 521 journaled in and extending between the vertical carriage end plates 282 and 283. A cross shaft 523 extending between and supporting plates 392 and 520 has rockably secured thereto a paper table 40, before mentioned in connection with Fig. 1, for supporting record material to be inserted between it and the rear of the platen and to be wound around the platen and up in front of the printer as is the "Journal" sheet appearing in Fig. 1.

The platen-carrying assembly is constantly urged to rock clockwise around shaft 521, as seen in Fig. 11, by springs 524 and 525 (see also Fig. 14) stretched between the said plates 392 and 520 and plates 282 and 283, and will rock clockwise until surface 526 on plate 392 strikes stop 527 and surface 528 on plate 520 strikes stop 529, unless otherwise restrained.

Referring to Fig. 20, a carriage latch operating bail extends between the carriage side plates 282 and 283 and is supported by arms pivoted to said plates, the left arm 531 and pivot 532 being shown in Fig. 20. The right end, not shown, is supported in a similar manner. The upper end of arm 531 has a bent-over ear 533 adapted to engage a shoulder 534 on latch plate 535. Spring 536 and a corresponding one on the right end tend to swing bail 530 in a latching direction. Thumb lever 46 pivoted on pivot 532 has an upwardly-extending ear 537 which bears against a stud 538 secured in the upper end of arm 531 and extending through a clearance slot in plate 520. By rocking the platen supporting assembly against the action of springs 524 and 525 by a forward pull on the top of paper table 40 the platen assembly is latched in its closed position with the platen in printing position. Rearward movement of the top of lever 46 will unlatch the platen-supporting assembly and upon the clockwise movement of it, as seen in Fig. 11, the platen will move upwardly and rearwardly.

The transparent plate 43 (Fig. 1) is held in a frame 542 pivoted to carriage frame plate 282 on a forward 542 and upward portion 540 (Fig. 14), and to carriage frame plate 283 (Fig. 11) on a similar forward and upward portion 541. The frame 542 is coupled at either end to the platen supporting side plates 392 and 520 by stud and slot couplings of conventional construction so that as the platen assembly is rocked to open position the frame 542 flops open, top toward the front, so that record material can be passed, from the front, under the platen and out the rear on a paper table 543 (Fig. 10).

On the bottom edge of the paper table 40 is a series of pressure rolls 544 supported on a shaft 545 supported by said table 40 at 546 and 547. The bottom edge of table 40 and consequently the rolls 544 are normally held against the platen so as to grip paper fed around the platen from the rear. The pressure rolls are pressed against the platen by a bar 548 pivoted in platen support side plates 392 and 520 which has spring fingers extending downwardly and resting against the lower edge of table 40. The bar 548 is spring urged to force the fingers against the paper table to keep the pressure rolls 544 against the platen or against the paper fed in from the rear. Rearward movement of lever 47 (Fig. 1) releases these pressure rolls by rocking bar 548. Lever 47 also rocks back paper bail 48 (Fig. 1) secured to an arm at either end, like arms 549 and 550 (Fig. 10), arm 549 also being shown in Fig. 1. These arms being pivoted at their rear ends to platen support side plates 392 and 520. The arms are joined by a rod 551 (Fig. 10) behind paper table 40. Lever 47, when moved rearwardly, operates on rod 551, in conventional manner, and lifts the paper bail. Lever 47 is held in operated condition in either one of two extents of movement by spring detent means of well known construction. In the second or full extent of rearward movement, as has been said, the rear pressure rolls are released so rear-fed paper can be alined.

A rear rockable paper table 543 (Fig. 10) which supports front fed record material is pivoted to shaft 521 (see Figs. 11 and 14) and has a portion extending under the platen in a forward direction. The front edge of paper table 543 has curved fingers extending up and around the platen, and the fingers are joined at their ends by the pressure plate 42 (Fig. 1) which, when the carriage is closed, is held against the platen or paper held around the platen, so that the paper is in proper contact with the platen for printing and tabulation. Front pressure rollers, not shown, extend between the curved fingers so as to hold the front fed paper against the platen for vertical feed when the carriage is closed. The rockable paper table is heavier in the front end than in the rear end and, when the platen rocks upwardly and backwardly and the transparent plate 43 flops open forwardly, the plate 42 on the front end of paper table 543 is left down, forming a chute between it and the platen so that paper may be fed into the chute. The carriage then is closed on it.

*Automatic carriage opening*

From what has been said, it will be apparent that rocking bail 530 (Fig. 20) in the direction of the arrow 583 will unlatch the platen assembly so it will rock in response to the urge of springs 524 and 525 (Figs. 11 and 14), throwing the platen upwardly and rearwardly so paper may be front fed under the platen onto the rear paper table.

Mechanical means, actuated by carriage movement has been provided, operable in either direction of carriage movement, or only in one direction of carriage movement, according to the selected controls and their placement on the stop bar, to open the carriage as it is moving.

Figure 32:
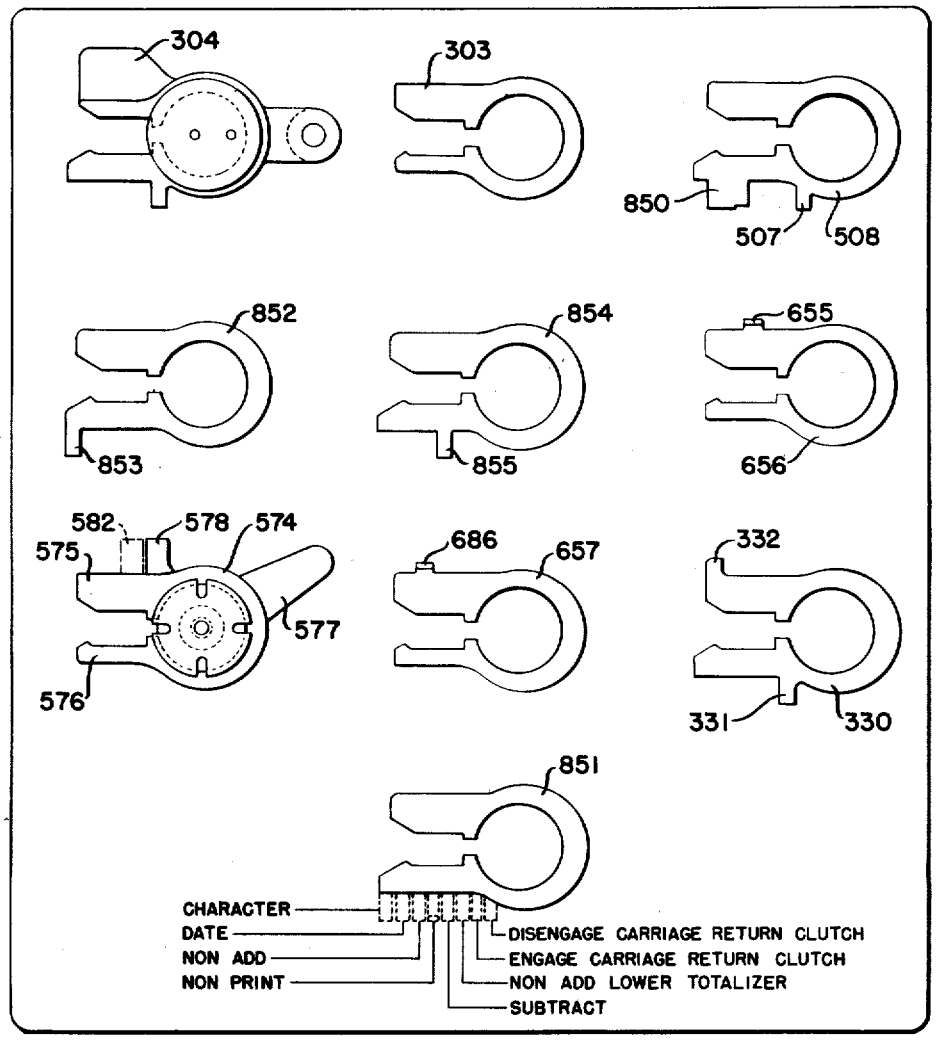
Fig. 32 is a chart of the profile of the stops used in the preferred embodiment.

Pivotally supported on a pin 560 running crosswise of the machine and through a supporting member of the machine framework is a yoke consisting of arms 561 and 562 joined at the rear end by plate 563. The lower edges of arms 561 and 562 have feet 564 and 565 respectively, which rest on a frame-supported rest 566 and against which they are urged by a spring 567. The front edges of arms 561 and 562 rest against bail 530. On the plate 563 is pivoted at 569 a by-pass cam pawl 568. Pivoted at 570 is a similar pawl 571. Pawl 571 is spaced rearwardly from pawl 568 so that a tappet formation on a carriage opening stop that is in line with pawl 568 would not be in line with pawl 571 and vice versa. An abutment 572 projects rearwardly from plate 563 and a spring 573 holds pawls 568 and 571 against the abutment. In the preferred embodiment of the machine as set up in accordance with the record material shown in Fig. 1, the carriage is opened just after starting its return movement and this is brought about by use of a carriage opening control member 574 (see Figs. 10, 20 and 32). Member 574 has the upper arm 575 and the lower arm 576 (Fig. 32) for clipping it onto the stop bar 288 in the usual manner, and has pivoted thereto a lever 577 having a tappet formation 578, which, when positioned, as shown in Fig. 32 and clipped on the stop bar 288 (Fig. 20) is in line with by-pass cam pawl 571. As the carriage is tabulating in the direction of arrow 579, tappet 578 rocks by-pass cam pawl 571 counter-clockwise, as seen in Fig. 20, with no effect. However, on carriage return which is in the direction of arrow 580 the tapet formation 578 strikes the sloping surface 581 of pawl 571, rocking bail 530 in the direction of arrow 583, unlatching the platen-carrying assembly which rocks to open position. This carriage opening occurs while the carriage is in motion. Control member 574 preferably is placed, as shown, so the carriage starts opening at the commencement of carriage return. Referring to Fig. 32, if the lever 577 is rotated clockwise, stop formation 578 is moved away out of alinement with by-pass cam pawl 571 and the automatic carriage opening will not occur.

The carriage may be made to open on tabulating movement thereof, that is in the direction of arrow 579 by providing a carriage opening tappet formation 582, as seen in dotted lines in Fig. 32, on lever 577 instead of tappet formation 578. Formation 582 will cooperate with by-pass cam pawl 568, by-passing it on carriage return and camming it up on carriage tabulation.

*Vertical feed of platen on carriage opening*

Referring to Figs. 11 and 13, a ratchet pawl 590 is pivoted at 591 to right carriage frame plate 283. The pawl has a ratchet tooth 592 adapted to cooperate with the teeth on the before-mentioned ratchet wheel 418 on platen shaft 419 which, as has been explained, is supported on its right end in plate 392. When the carriage opens, tooth 592 moves relatively to ratchet wheel 418 but normally is kept from contact therewith because even though a spring 593 urges tooth 592 into engagement with the ratchet wheel it cannot make such movement as a stud 594 on pawl 590 strikes the rear edge of lever 61 which normally is in "0" position (see Fig. 13). Lever 61 is pivoted at 595 on platen support side plate 392. If lever 61 is moved to the "1" position tooth 592 approaches and engages ratchet wheel 418 so that on opening the carraige the platen is moved one step. When moved to the "2" position the tooth 592 is permitted to move closer so when the carriage opens the platen will be given two steps of movement. These vertical feed movements are supplementary to the vertical movement of the platen given by machine operation.

*Automatic cut-off of main motor supply circuit when carriage is opened*

A switch 600 (Figs. 9 and 22) which normally is closed, is provided in the main motor supply circuit which is closed by switch 89 to start a machine operation. This is secured to the rear vertical cross brace 601 of the machine. The switch has resting on its operating button 602, a plunger 603 which, when pushed down, opens switch 600. Plunger 603 is held alined vertically by passing through holes in brackets 604 and 605 secured to the brace 601. A spring in the switch holds the button up, carrying the plunger with it. Pivoted to bracket 606 is collar 607 which has a roller on a radial stud which lies in back of carriage opening bail 530 (see also Fig. 20). Secured to the side of collar 607 is an ear 609 resting on top of plunger 603. As the bail moves in the direction of the arrow, collar 607 is rocket so that ear 609 bears down on plunger 603 breaking the motor circuit when the carriage is opened.

*Automatic means for locking the machine trip lever when the carriage is not on a stop*

In order to prevent the machine from being tripped to initiate a machine operation when the carriage is not on a stop, mechanical means is provided to latch trip lever 86 (see Figs. 7 and 18) against movement from home position by trip lever 88 (Fig. 2). Pivoted in hole 610 (Figs. 17 and 18) on the rear end of tabulating stop bar 297, by pivot 611, is a member 612 having a slanting cam edge 613a. Member 612 is raised upwardly on return movement of the carriage as tabulating stop bar 297 rocks upwardly. However, on tabulating movement of the carriage member 612 is rocked on its pivot when its edge 613a is struck by a stop. Fig. 18 shows a stop about to rock member 612. The downwardly-extending leg of member 612 strikes arm 613 of a link 614 slidably mounted, by stud and slot coupling, to the machine framework, moving link 614 forwardly to rock a lever 615 counter-clockwise around its supporting stud 616. The lower end of lever 615 has a stud 617 bearing against the upper end of a bell crank lever 618 pivoted to the framework at 619a. The forward end of lever 618 has a hook 619 which normally engages machine trip lever 86 (also see Fig. 7). When a stop rocks member 612, hook 619 is raised against the action of spring 620 permitting the machine to be tripped. Thus, the machine cannot be tripped when the carriage is in between stops.

*Automatic total taking and sub-total taking*

Secured to cross frame member 625 (Fig. 7) are two solenoids 626 and 627 (see also Figs. 27 and 30) supplied with operating current through a main common switch 55 (Fig. 28), common switch 460, before mentioned in connection with Fig. 23, and individual switches 629 and 630. Operation of solenoid 626 pulls in on core 632 (Fig. 30) rocking shaft 633 through link 634 and lever 635. Shaft 633 through lever 636 pulls forward on link 666 pivoted at its rear end to lever 667 (see also Fig. 2) pivoted to the side plate 91. Lever 667 is pivoted to link 233 having a slot embracing stud 230 on the total slide. Thus, operation of solenoid 626 will set the machine into a total-taking operation.

Presuming main switch 55 (Fig. 28) and listing switch 460 are closed, the closing of switch 630 will, therefore, set the machine into a total-taking operation. Referring to Fig. 24, switch 630 is closed by pressure applied to its operating button 641 against which the end of a lever 662 rests.

Lever 662 is secured to the end of a shaft 643 having a lever 680 secured to its other end. Shaft 643 is supported by bracket 646. Lever 680 bears against an arm of a bell crank lever 682 pivoted at 650 to the machine frame. An ear 683 thereon cooperates with a by-pass pawl 659 of bell crank shape rockably mounted on the rear end of tabulating stop bar 297. As the carriage tabulates in the direction of arrow 685 a tappet formation 686 on stop 657 rocks pawl 659 which rocks levers 682 and 680, thus closing switch 630. This operates the total-taking solenoid to set the machine in operation for total taking. By-pass pawl 659 is rocked without effect by formation 686 as the carriage returns in the direction of arrow 658.

A sub-total-taking operation is started by closing switch 629. Yoke 644, of which arm 642 is a part, is rockably mounted on shaft 643. The other arm 647 of yoke 644 has bearing against it a forwardly-extending arm 648 of lever 649 also pivoted at 650 to the machine frame. A rearwardly-extending arm 651 of lever 649 has a sidewardly bent ear 652 on which rests a sidewardly-extending arm of a by-pass bell crank lever 653 rockably mounted on the tabulating stop bar 297. The other arm of bell crank lever 653 is in the path of movement of a sub-total tappet formation 655 on stop 656 located on the stop bar 288. When the carriage is returning in the direction of arrow 658, tappet 655 rocks bell crank lever 653 clockwise, as seen in Fig. 24, without effect. But in tabulating, the tappet 655 will rock bell crank lever 653 counter-clockwise which rocks lever 649 counter-clockwise, which closes the switch 629, starting a sub-total-taking operation. The profiles of stops 656 and 657 are shown in Fig. 32.

*Means for preventing tripping of the machine while the carriage is returning*

Referring to Fig. 29, the rearwardly-extending arm 890 of three-armed lever 97 (see also Fig. 8) has a bent-over ear 891 by which it is caught in home position by latch piece 85. Ordinarily latch piece 85 is rocked to ineffective position by the end of lever 86 when the machine is manually tripped, allowing lever 97 to rock in response to the urge of spring 98, setting the machine in operation. To prevent such, during carriage return operations, an upright member 892 is attached to lever 351. The upper end of member 892 has a notch 893 which, when lever 351 is in the carriage return position, is positioned under ear 891, preventing the lever 97 from rocking even though the latch piece 85 has been rocked to ineffective position. Thus, operation of the machine is prevented during carriage return.

*Machine operation*

As the carriage is returned, the tabulating stop bar strikes the formation 304 (Figs. 10 and 32) on the terminal stop. The carriage is open and the journal sheet is in place. The operator then sets up the old balance of the account in question, after inserting, from the front, the ledger card and customer's statement, and closing the carriage. The add motor bar 26 is depressed, entering the amount additively in both totalizers after which the machine tabulates to the date and reference column where it is stopped by stop 508 having, in addition to the carriage return clutch disengaging tappet 507, before mentioned, the formation 850 which controls the machine according to the functions noted on the sample stop 851 (Fig. 32). The machine functions of printing controls and totalizer engaging controls will not be gone into further than has been set forth as the constructions are old and do not bear on the invention herein. Reference is made to the mentioned Frieberg and Larsen application, Serial No. 349,228, filed April 14, 1953, for such further disclosure. The machine is set in operation, printing the date and folio, and the carriage tabulates to stop 852 which has a tappet formation 853 which enables the character printing hammer. The amount of the transaction is entered through use of the digit keyboard and the add motor bar 26. The machine may be operated by the vertical feed motor bar if there is more than one item in the transaction, and may be held down if a carriage return to the date and folio column is required. Tabulation from the charge column to the credit column is against stop 854 which has a subtract tappet formation 855, conditioning the machine to automatically subtract an item set up on the digit keys unless reverse key 28 (Fig. 1) is first operated. The machine, next, tabulates to stop 656 which has the sub-total control 655 setting the machine into a two-cycle sub-total operation. During the first of the two cycles the tabulating mechanism tabulates the machine to plain stop 303 where the sub-total of the upper totalizer is printed. Then, the carriage tabulates to stop 856, which like stop 854, is a subtract stop. Here the old balance is again set up and subtracted from both totalizers by use of the add motor bar 26. The carriage, then, tabulates by carriage opening control member 574 and against total-taking stop 657 and before the second cycle of the total-taking operation tabulates to carriage return stop 508. After the total is printed, the carriage is returned and, while returning, the carriage is opened so the ledger sheet and customer's statement may be removed. As the carriage opens the journal sheet is spaced upwardly according to the setting of lever 61 (Fig. 1).

While the form of the mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a calculating machine, in combination, type adjustable to a printing station; a record material carriage shiftable back and forth past the printing station; a platen-supporting framework rockably mounted on the carriage; a platen supported in the framework, the rockable mounting of the framework permitting movement of the platen toward and away from the printing station in a direction at a right angle to the direction of carriage shifting; a means constantly urging the framework to rock so the platen is moved away from the printing station; a latch means operable when the framework is rocked to bring the platen to the printing station to hold it there against the means urging it to rock the other way; and cam means operable by the movement of the carriage when the carriage is shifting in either direction to move the latch means to ineffective position, whereby the framework is rocked to move the platen away from the printing station.

2. The machine of claim 1 in which the cam means includes one by-pass camming pawl for rendering the latch means ineffective in one direction of carriage shifting and another by-pass camming pawl for rendering the latch means ineffective in the other direction of carriage shifting.

3. The machine of claim 2 in which the carriage is equipped with a selectively positionable tappet for co-operating with an associated one of the camming pawls for rendering the latch means ineffective on a shifting of the carriage in one direction, the position of the tappet determining at what point in the shifting movement the latch means is rendered ineffective.

4. In a calculating machine, in combination, a main operating means; a printer; a record material carriage shiftably movable laterally with respect to the printer; a cylindrical record material platen; a frame in which the platen is mounted, said frame being mounted on the carriage and being rockable with respect to the printer so the platen can be moved to printing position toward the printer, and away from printing position, said rocking movement of the frame being in a direction at a right angle to the direction of shifting; a first means actuable by the relative movement between the frame and carriage as the platen is rocked away from printing position for rotating the platen on its axis; and a second means actuable by the main operating means each machine operation for rotating the platen on its axis in the same direction as the first means rotates said platen and in addition thereto.

5. The machine of claim 4 in which there is provided a control selectively operable to determine the degree of rotation, if any, given the platen by the first platen rotating means during a rocking of the frame.

6. The machine of claim 4 in which there is provided a control selectively operable to determine the degree of rotation, if any, given the platen by the second platen rotating means.

7. In a calculating machine, in combination, an electric motor; a main operating means actuated by operation of the electric motor; an electric supply circuit for the motor, said circuit containing a normally closed switch; a printer; a carriage shiftably mounted with respect to the printer; a framework rockably mounted on the carriage, the framework being rockable to move the platen toward the printer so record material held thereby may be printed upon, and being rockable away from the printer so record material may be easily inserted; means constantly urging the platen framework to rock away from the printer; latch means operable when the platen framework is rocked toward the printer to latch it there against means urging it away; unlatching means operable to unlatch the latching means to allow the platen framework to move away from the printer; and switch actuating means operated by operation of the unlatching means to open the switch.

8. The machine of claim 7 in which the switch actuating means is attached to the machine proper and the unlatching means includes a bail supported by and running the length of the carriage, and cooperating with the switch actuating means regardless of the lateral position of the carriage with respect to the printer.

9. In a calculating machine, in combination, a cyclically operable main operating means; power means for actuating the main operating means; a mechanical linkage movable to initiate a cycle of machine operation during which said main operating means is actuated by the power means; a printer; a record material carriage shiftable laterally with respect to the printer; a plurality of position stops selectively positioned along the carriage; means urging the carriage to shift in a tabulating direction; tabulating means including a stop bar operable to allow the carriage to shift from one position to another as determined by the stops; latch means normally engaging the mechanical linkage, preventing it from moving to initiate a cycle of operation; and means from moving said latch means to ineffective positive as a stop strikes the tabulating stop bar.

References Cited in the file of this patent

UNITED STATES PATENTS

| 2,082,098 | Christian | June 1, 1937 |
| 2,202,595 | Muller | May 28, 1940 |
| 2,441,870 | Christian | May 18, 1948 |
| 2,503,805 | Davidson et al. | Apr. 11, 1950 |

UNITED STATES PATENT OFFICE
CERTIFICATE OF CORRECTION

Patent No. 2,813,611　　　　　　　　　　　　　　　　　　　　November 19, 1957

Nelson R. Frieberg et al.

It is hereby certified that error appears in the printed specification of the above numbered patent requiring correction and that the said Letters Patent should read as corrected below.

Column 1, line 32, for "substractively" read -- subtractively --; column 3, line 28, for "mechanisms" read -- mechanism --; column 5, line 65, for "paten" read -- platen --; column 11, lines 43 and 44, strike out "the pinions are disengaged from the totalizer. ment" and insert instead -- and when the machine is at rest are in engagement --; line 45, for "rocks" read -- racks --; column 12, line 73, before "subtract" strike out "on"; column 17, line 18, for "shart" read -- shaft --; column 23, line 41, for "tapet" read -- tappet --; column 24, line 1, for "carraige" read -- carriage --; column 24, line 24, for "rocket" read -- rocked --; column 26, line 62, for "caming" read -- camming --; column 28, line 22, for "from" read -- for --.

Signed and sealed this 21st day of January 1958.

(SEAL)
Attest:

KARL H. AXLINE

Attesting Officer

ROBERT C. WATSON
Commissioner of Patents